(12) United States Patent
Vroom

(10) Patent No.: US 11,137,054 B2
(45) Date of Patent: Oct. 5, 2021

(54) SLIDING SUPPORT MECHANISM

(71) Applicant: David H. Vroom, Tucson, AZ (US)

(72) Inventor: David H. Vroom, Tucson, AZ (US)

( * ) Notice: Subject to any disclaimer, the term of this patent is extended or adjusted under 35 U.S.C. 154(b) by 0 days.

(21) Appl. No.: 17/326,228

(22) Filed: May 20, 2021

(65) Prior Publication Data

US 2021/0270351 A1 Sep. 2, 2021

Related U.S. Application Data

(63) Continuation-in-part of application No. 17/117,759, filed on Dec. 10, 2020, now Pat. No. 11,047,457, which is a continuation of application No. 16/727,251, filed on Dec. 26, 2019, now Pat. No. 10,927,929, which is a continuation-in-part of application No. 16/666,184, filed on Oct. 28, 2019, now Pat. No. 10,883,577, which is a continuation of application No. 16/268,235, filed on Feb. 5, 2019, now Pat. No. 10,480,627.

(51) Int. Cl.
*F16H 19/04* (2006.01)
*B60P 3/34* (2006.01)

(52) U.S. Cl.
CPC ............... *F16H 19/04* (2013.01); *B60P 3/34* (2013.01)

(58) Field of Classification Search
CPC .................................. F16H 19/04; B60P 3/34
See application file for complete search history.

(56) References Cited

U.S. PATENT DOCUMENTS

| | | | | |
|---|---|---|---|---|
| 7,607,365 B1 * | 10/2009 | Courser | .................... | B60P 3/34 296/171 |
| 8,967,694 B2 * | 3/2015 | Garceau | .................. | F16H 19/04 296/26.13 |
| 9,050,923 B1 * | 6/2015 | Garceau | ..................... | B60P 3/34 |
| 9,545,870 B2 * | 1/2017 | Walls | ....................... | F16H 19/04 |
| 10,259,374 B2 * | 4/2019 | Garceau | .................. | F16H 19/04 |
| 10,851,885 B2 * | 12/2020 | Zulauf | ..................... | F16H 19/04 |
| 10,864,842 B2 * | 12/2020 | Lopez | .................. | B60P 3/0252 |
| 10,882,438 B2 * | 1/2021 | Garceau | .................. | B60P 3/34 |
| 10,927,929 B2 * | 2/2021 | Vroom | ..................... | B60P 3/34 |

* cited by examiner

*Primary Examiner* — David M Fenstermacher
(74) *Attorney, Agent, or Firm* — Yakov Sidorin; Quarles & Brady LLP

(57) ABSTRACT

Rack-and-pinion sliding support mechanisms and mechanical elements thereof. One or more shafts are coupled to pinions configured to engage with one or more racks and configured to be driven by one or more motors. The rack and pinion are configured to provide vertical and horizontal displacement to reduce premature component wear leading to poor gear mesh caused to by forces on the mechanism during use. Motor assembly in such support mechanism is modified—as compared to current industrial versions—to prevent the destruction of motor-assembly housing by torques generated by the one or more motors and transferred to the pinions, thereby reducing motor failures.

20 Claims, 17 Drawing Sheets

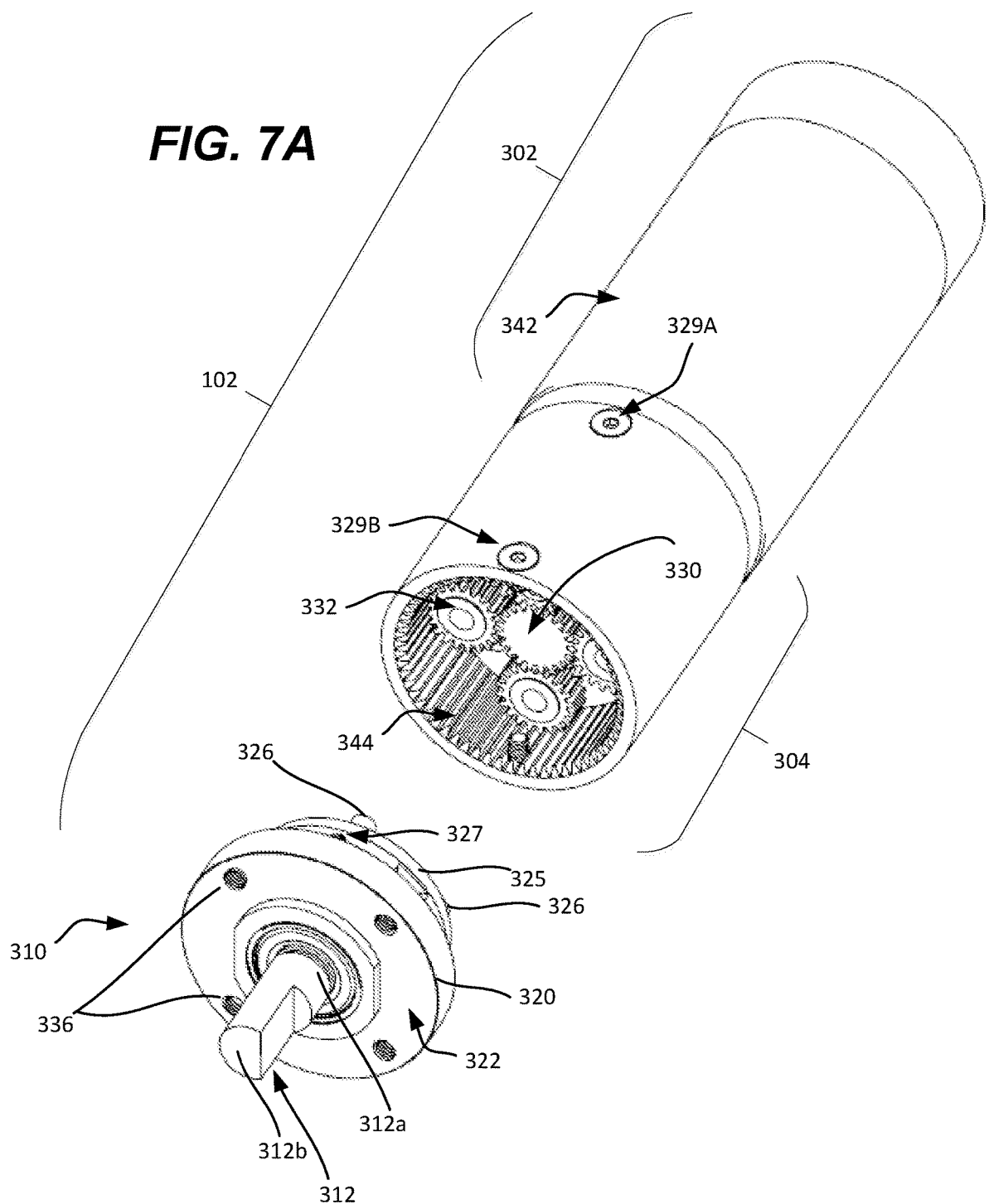

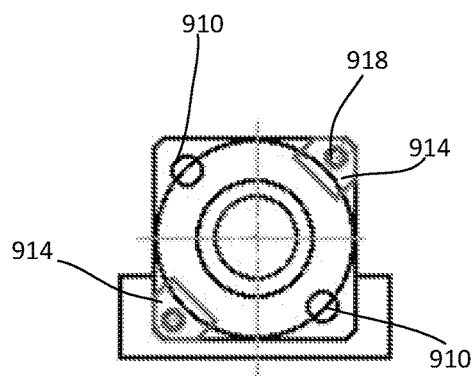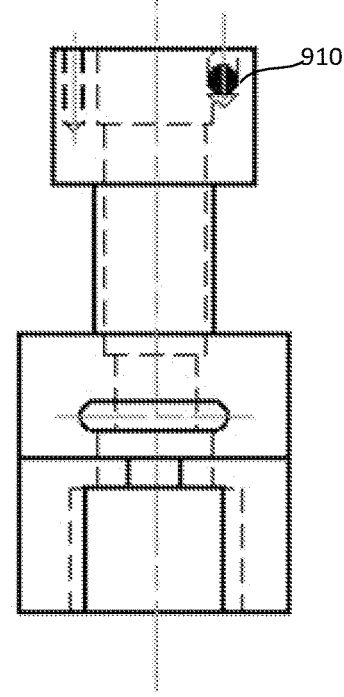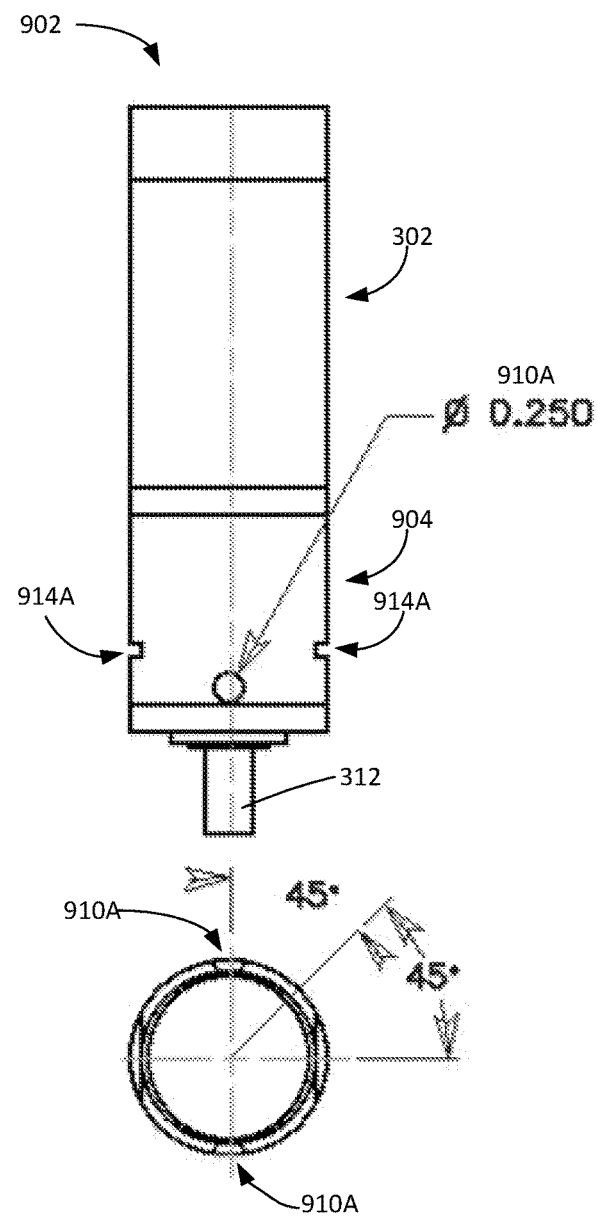
FIG. 9A
FIG. 9B

SLIDING SUPPORT MECHANISM

CROSS-REFERENCE TO RELATED APPLICATIONS

This application is a continuation-in-part of the U.S. patent application Ser. No. 17/117,759 filed on Dec. 10, 2020 and now published as US 2021/0095745, which is a continuation of the US patent application Ser. No. 16/727,251 filed on Dec. 26, 2019 and now issued as U.S. Pat. No. 10,927,929, which is a continuation-in-part of the U.S. patent application Ser. No. 16/666,184, filed on Oct. 28, 2019 and now issued as U.S. Pat. No. 10,883,577 published as US 2020/0248785, which is in turn a continuation of the U.S. patent application Ser. No. 16/268,235, filed on Feb. 5, 2019 and now issued as U.S. Pat. No. 10,480,627. The disclosure of each above-identified application is incorporated herein by reference.

RELATED ART

Motorized sliding support mechanisms are well-known and used to support structures the positions of which need to be changed under different circumstances. One example is provided by a motorized drawer. A more demanding example is a well-known "slide-out" module, commonly included in a recreational vehicle (RV) or motor home. RVs frequently include living spaces, which can be expanded when the vehicle is parked, to provide additional room. These "slide-outs" extend from the outer walls of the vehicle and are suspended over the ground. For convenience, and because slide-outs (or slide-out sections) can be extremely heavy, it is often desirable to equip them with a motorized mechanism or driver to automatically extend and retract the slide-out as desired. Some of these motorized mechanisms use a set of rack and pinions connected to the sides of the slide-out section(s). Electric motors drive the pinions, which are typically mounted in an assembly (including the motor and residing within a compartment within a side portion of the vehicle). The pinions, in turn, engage with the rack and drive a given slide-out forward or backward relative to the pinions.

Conventional motor-driven sliding support mechanisms (such as those currently used for RV slide-outs) have various structural and operational deficiencies. For example, the rack and pinions are prone to bending (under the weight of the slide-out module) and/or degradation (e.g., abrasion and wear of teeth on the pinions and the corresponding grooves in the rack), which reduce the ability of the motor to slide the supported structure with the available electrical power. For example, some conventional mechanisms were observed to poorly gear mesh with the rack under common operating conditions. Additionally, some conventional mechanisms were proven to fail to solidly couple the motor to the shaft and other components, which led to severing the motor wires when the mechanism experienced unexpected movements or forces. These and other problems may cause the motorized slide-out mechanisms to fail. Furthermore, the structures coupling the motor to the pinions frequently make it difficult or impossible to move the mechanism manually in the event of a motor failure. In the example of an RV slide-out, these failures may occur in remote locations while also making it dangerous or impossible to drive the RV to a repair facility. There exists a need for structural and/or functional improvements to the sliding mechanisms of related art, to address these and other operational shortcomings.

SUMMARY OF THE INVENTION

To outline the benefits provided by embodiments of the present invention, the user may benefit from considering features of the embodiments of the invention in context of applications in RVs, as examples. (Embodiments include support mechanisms and motor assemblies used in these support mechanisms, as well as methods for integrating and employing such support mechanisms and motor assemblies within RVs.)

RVs frequently make use of slide-outs to increase available living space. For instance, a bedroom slide-out might increase the size of a bedroom area by extending outward from the walls of the RV. Typically, these slide outs are supported from below (under the floor of the module) by a roller or conveyor-type structure. In the conventional slide-outs discussed above, the slide-out will have racks mounted to each of two sides which are perpendicular to the outer walls of the RV. These racks engage with a shaft coupled to motor, which drives the slide-out in and out. Because of the dimensions and weight of such slide-outs, there typically is a dedicated motor for each of the two perpendicular side walls.

It should be understood that these slide-outs may not be entirely rigid. For instance, the floors may bend, flex, and warp over time. In addition, uneven distribution of weight within the slide-out module due to furniture of the presence of people inside them may also cause non-uniform displacement in the floors. Such unevenness will often lead to one side of the slide-out being displaced upward or downward with respect to the opposite side. In addition, as the slide-out is deployed, it is cantilevered over the ground. Since only the portion of the slide in contact with the walls or floor of the RV is supported, the racks on both sides will experience a torque which will tend to rotate the slide-out with respect to the racks. In addition, if the racks are driven by a rotor and shaft, the racks will experience a back-torque that will tend toward twisting the slide-out relative to the walls of the RV. If a slide-out support is not properly designed, all these forces can lead displacement and flexure of various components of the support mechanism leading to poor gear mesh between the racks and the respective shafts used to drive the racks. Poor gear mesh can ultimately lead to excessively worn gear teeth and eventual failure of the mechanism. Therefore, there remains an unsatisfied industrial need in providing rack-to-pinion coupling structures designed to maintain the gear meshing substantially unperturbed regardless of the operational status of the sliding mechanism.

Because such sliding mechanisms rely on motors (of the motor assemblies) with very high gear reductions (due to need for the motors to fit unobtrusively with the walls of an RV), it can be extremely difficult or even impossible to manually deploy or stow and RV slide-out if one or more motor fails. A typical slide-out mechanism of related art is used in thousands of RVs or more every year and utilizes a splined shaft rather than distinct pinions coupled to a bearing-mounted shaft as disclosed herein. For example, a sliding mechanism of the related art does not connect the motor/brake solidly to the upper pinion housing in order to provide a means for separating the motor/brake from the pinion gears (the splines) which are meshed with linear gear racks mounted to the sides of the slide-out. Separating the motor/brake from the splined shaft pinion gear assembly is required to be able to manually push the slide-out back in for travel should a drive failure occur. In other words, there remains a need in providing means of decoupling the racks from the motors to allow the shafts to turn.

According to the idea of the invention, the disclosed sliding support mechanisms (or, sliding mechanisms, for short) address at least several specific deficiencies of known motorized sliding support mechanisms. First, embodiments disclosed herein use racks and pinions configured to ensure proper operational meshing between the pinion teeth and rack grooves, which remains substantially unperturbed even when the mechanism experiences mechanical forces which will tend to move these components out of alignment. For instance, when an RV slide-out is deployed, the racks may experience a downward (vertically-pointing) force due to the weight of the slide-out that is suspended—at a lever— beyond the walls of the RV. Similarly, if the slide-out has a non-uniform mass distribution, or the RV rests on an unleveled surface, the racks and pinions may experience lateral torques (the ones having at least a vector component in a horizontal plane) that tends toward misalignment of the pinions with their corresponding racks that in turn binds the pinion and the rack and quite often ceases the movement of one with respect to another (the latter causing a lot of predicaments on the road). Another problem solved with the use of embodiments of the invention manifests in failure of a motor assembly (also referred to herein as a motor gearbox assembly, which is employed to move one part of the rack-and-pinion mechanism supporting a heavy load of a slide-out structure with respect to another). Such failure is typically caused by inability of the conventionally-structured motor assemblies to withstand high-level rotational torque transferred from the gear portion of the motor assembly to the rotor portion of such assembly, rendering the motor assembly unusable and preventing the slide-out from being moved out and/or in at the time when expected the least. Yet another common problem stems from structural limitations of various brackets, beams, rails and other generally spatially-profiled support elements (aggregately referred to herein as support structures) used to operationally couple the element(s) of the conventional sliding mechanism (s) with the portions of the outside bodies (for example, the walls of the RVs themselves) in relations to which such sliding mechanisms operate. The discussed embodiments facilitate free, uninhibited sliding and/or translational movements of the portions of the sliding mechanisms within the rails cooperating such sliding mechanisms with the walls of the outside structure.

BRIEF DESCRIPTION OF THE DRAWINGS

The invention will be more fully understood by referring to the following Detailed Description of Specific Embodiments in conjunction with the not-to scale Drawings, of which:

FIG. 6A: exploded perspective view of the modified motor assembly; FIG. 6B: partially-exploded perspective view of the modified motor assembly; FIG. 6C: partially-exploded perspective view of the modified motor assembly with a cut-out, showing the contents of the motor assembly housing.

FIGS. 7A, 7B, and 7C present various views of portions of a conventionally-structured motor assembly forming a part of the embodiment of FIGS. 1A, 3A.

FIGS. 9A, 9B, 10, 11 illustrate, in various views, alternative embodiments of structural cooperation of the modified motor assembly with a pinion assembly of the sliding support mechanism.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

To facilitate the understanding of the description, and unless explicitly stated otherwise, the following directional terms may be used 'upper', 'lower', 'inner', 'outer', 'top', 'bottom', et al. These terms are not intended to limit the embodiments by required any preferred orientation but, rather, refer to the mutual orientation between various parts and components illustrated in the figures. It should also be understood that substantially similar components are at times identified using a single reference number or term for simplicity of presentation. For instance, each pinion belonging to a pair of pinions may be simply referred to as a pinion. It should also be understood that while the discussion of the embodiments of the invention is carried out referring to slide-outs and other similar structures, such references as used only as examples, to aid in understanding features and advantages of the idea of the invention, and not to limit the invention to the specific implementations of the slide-out and/or related structures.

Structural Features to Prevent Misalignments Between the Rack and Pinion During the Operation of the Mechanism The immediately-following portion of the disclosure addresses the problem that is ever-persisting in the rack-and-pinion-based sliding mechanisms of related art and that manifests in insufficient operable engagement and/or excessive friction or binding between the pinion gear and the rack gear of the mechanisms of related art, caused by various misalignments (whether linear or angular, for example with respect to the main, vertically-oriented axis of the sliding mechanism during its operation along the axis of translation of the sliding mechanism) between the pinion and rack leading to "locking" or even breaking of the sliding mechanism.

Figure 1A:
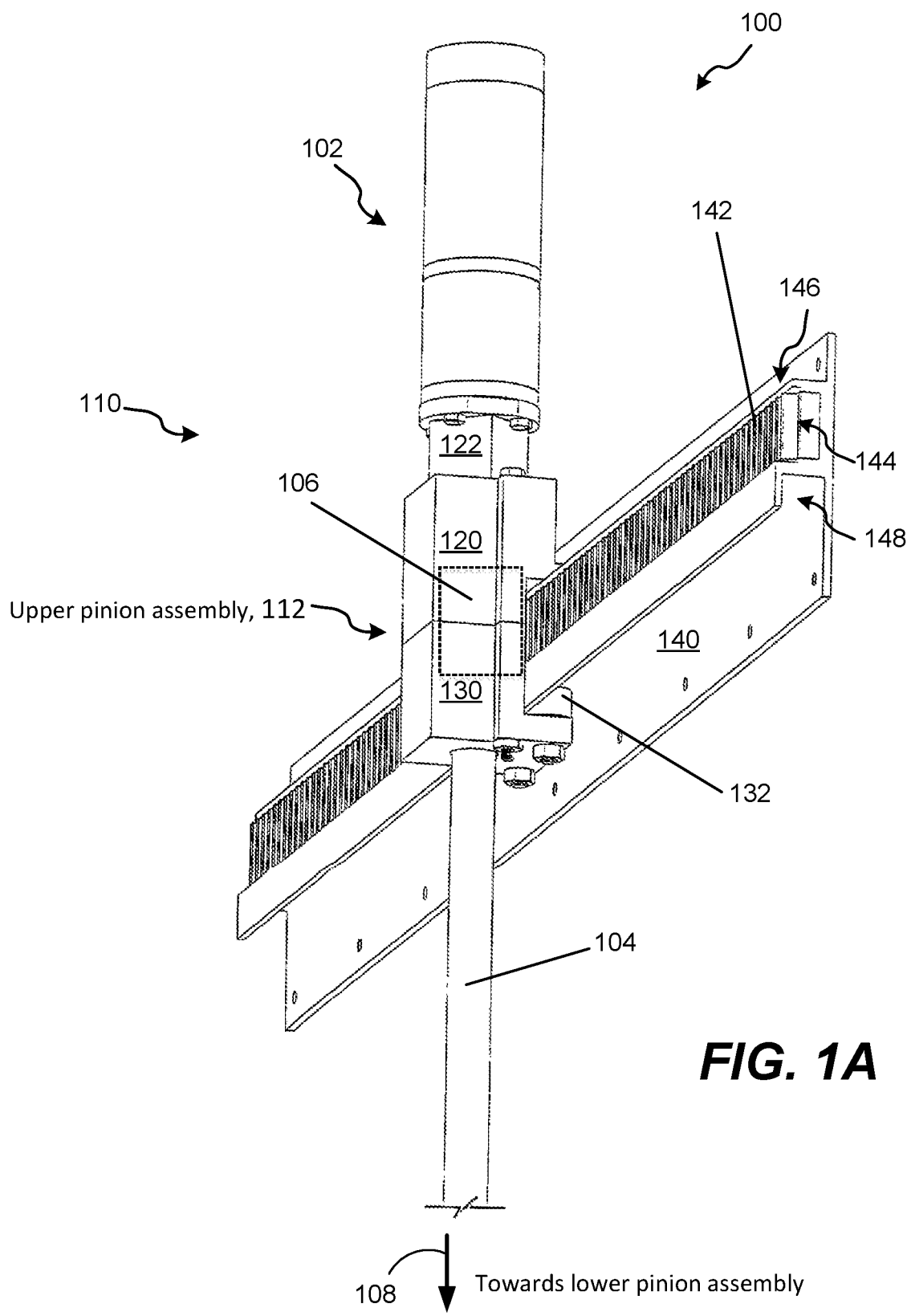
FIG. 1A is a perspective view of an embodiment of the sliding support mechanism configured according to an idea of the invention.

FIGS. 1A, 1B, 1C, and 1D illustrate key features of one non-limiting example of a sliding support mechanism 100, structured according to the idea of the invention. What is expressly shown in FIG. 1A is only the upper portion of the mechanism 100. The upper portion of the mechanism 100 shown in FIG. 1A generally includes a shaft assembly 110 and a rack assembly 140. As shown in this example, the shaft assembly 110 includes a motor gearbox assembly 102 (interchangeably referred to herein as a motor assembly), a shaft 104 (rotated by the motor assembly when engaged with it), a pinion 106, and a housing unit that includes an upper shaft housing 120, and a lower shaft housing 130. (The presence of the lower portion of the mechanism, which substantially duplicates the operationally-cooperated rack-and-pinion sub-systems, is indicated with the arrow 108. Unlike the upper portion of the sliding mechanism expressly illustrated in FIG. 1A, the lower portion of the mechanism does not include a motor assembly 102: the motor assembly is disposed only at one end of the shaft 104). The combination of the first upper shaft housing portion with the first lower shaft housing portion forms the first shaft housing. Understandably, in one specific case the first shaft housing can be formed 0for example, molded or machined) as a unitary piece, in which the first upper shaft housing portion and the first lower shaft housing portion are inseparable from one another, while in a related embodiment the first upper shaft housing portion and the first lower shaft housing portion are configured to be separable and, upon juxtaposing with and being attached to one another, form the first shaft housing.

Figure 1B:
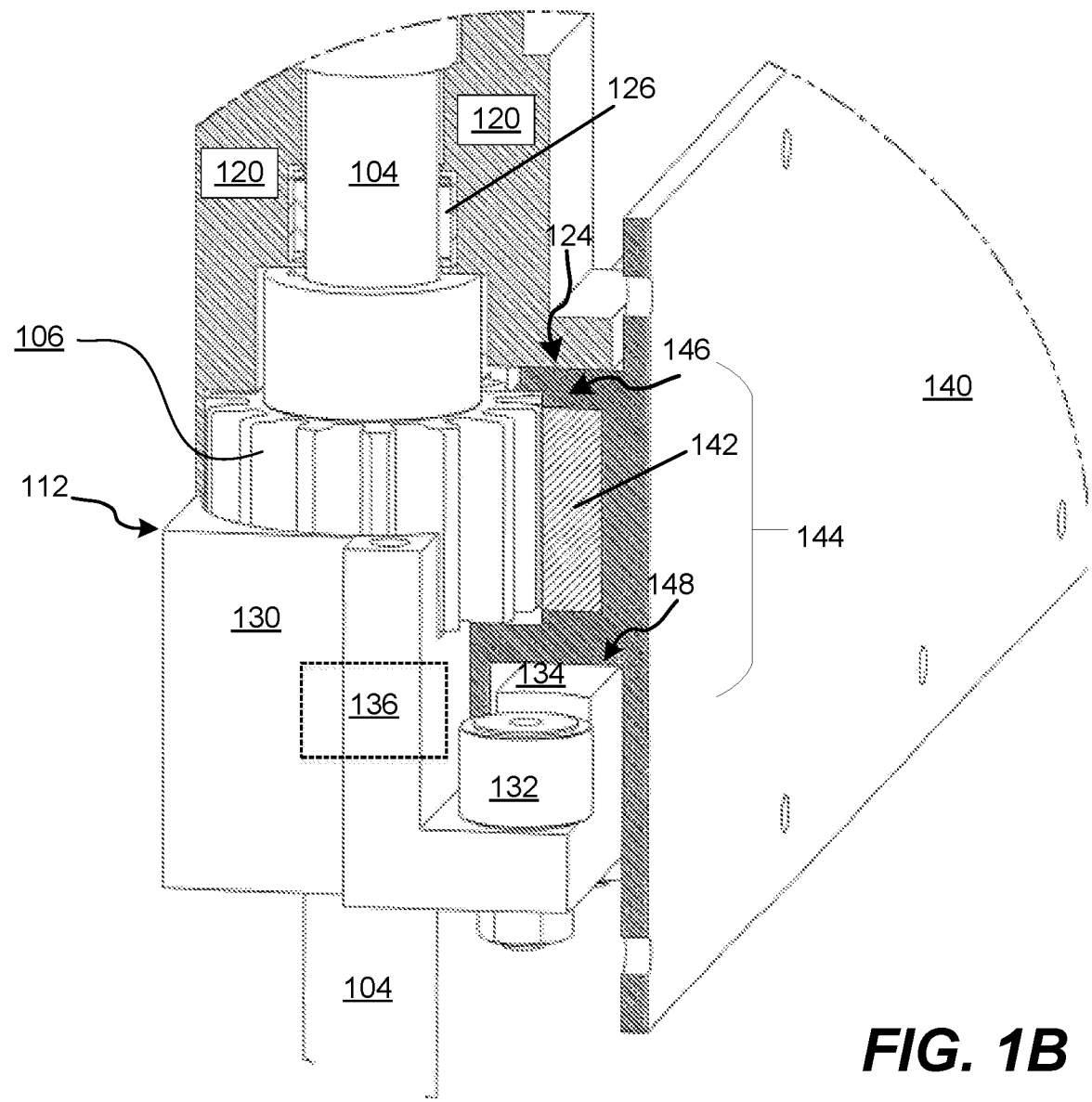
FIG. 1B is a cross-sectional perspective view showing further details of the embodiment of FIG. 1A.
Figure 1C:
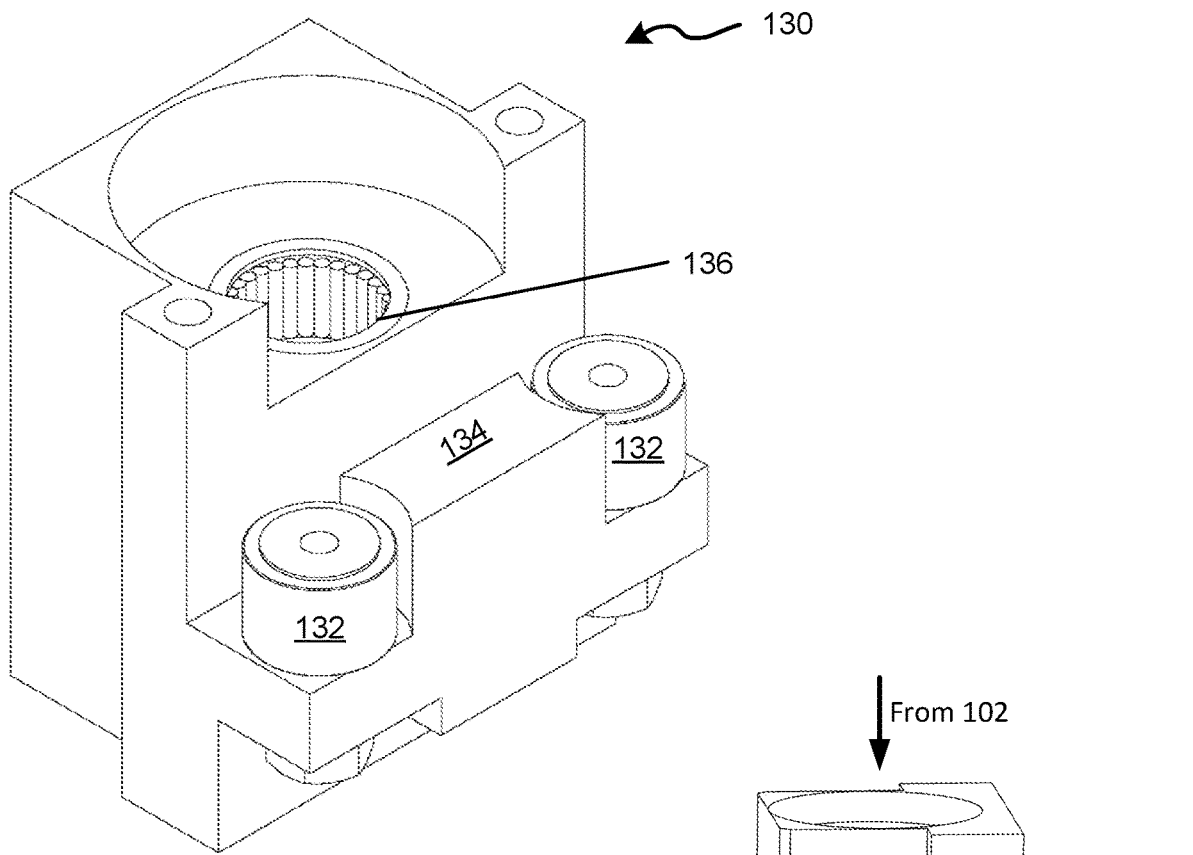
FIG. 1C is a detailed perspective view of selected elements shown in FIGS. 1A and 1B.

FIG. 1B is a hybrid cross-sectional perspective view with cutaways, illustrating certain features of the embodiment of FIG. 1A in greater detail. FIG. 1C provides a simplified illustration of a portion of the lower shaft housing, and FIG. 1D addresses the specific form of coupling between a shaft housing and the rack assembly.

In one specific case, the motor assembly 102 is operationally attached to the upper shaft housing 120 with a motor coupling 122 (seen in FIG. 2), inside which the rotor of the motor assembly is coupled to the end of the shaft 104. (Related arrangements of coupling the rotor of the motor assembly with the shaft are discussed below.) The shaft assembly 110 includes at least one pinion 106 (shown in detail in FIG. 1B), which is dimensioned to couple to the shaft 104 and to engage the rack assembly 140. For convenience, the upper shaft housing 120 and the lower shaft housing 130, taken together with the components they embrace or house or include, may be referred to as (an upper) pinion assembly 112. It is understood, therefore, that the shaft assembly generally includes the motor gear-box assembly 102, the pinion assembly 112 appropriately operationally coupled with the motor assembly 102 (that is, via the motor coupling 122 or in a different fashion as discussed below), and the shaft 104 passing therethrough. The shaft assembly 110 is configured to be coupled to a rack 142. In further reference to FIGS. 1A and 1B, the rack assembly 140 includes a rack 142 and a recess profile 144, in which the rack 142 is secured.

To address the prevention of frequently-occurring misalignment between the inion and the rack, persisting in sliding mechanisms of related art, and according to the idea of the invention, at least one of the upper shaft housing 120 and the lower shaft housing 130 includes component(s) specifically structured to maintain the nominal and pre-determined orientation between the shaft assembly 110 and the rack assembly 140 regardless of the presence of forces tending to de-couple the rack from the pinion in a plane containing the shaft 104 or in a plane transverse to the shaft 104. In the example of FIG. 1C, for instance, the lower shaft housing 130 is shown to include at least a pair of rollers 132 and/or the wear surface 134 that protrudes between the rollers 134 (one of which is visible in FIGS. 1A and 1B). It is the operational misalignment between the pinion 106 and the rack 142, caused by the "rocking" of the pinion assembly 112 with respect to the rack 142 in a plane substantially transverse (or even perpendicular) to the shaft 104 that the use of necessarily multiple rollers 132—when housed in the structure of the recess profile 144 of the tack assembly 140, as discussed below—tends to negate. Indeed, as practice showed on more than one occasion, the use of only one, single roller for this purpose is not as advantageous as the use of, for example, two rollers, as the rack and pinion may still be brought out of alignment to the point of being stuck, thereby simply ceasing the operation of the sliding mechanism and requiring a time-consuming repair. (In fact, plentiful evidence exists that in practice of operation of the conventional sliding mechanisms employing only a single roller this is exactly what occurs, rendering the use of a single roller utterly insufficient.) The presence of the material block with the surface 134 even further stabilizes the operational coupling between the rack and the pinion against the rocking motion occurring in the plane substantially transverse to the shaft 104. Nevertheless, the scope of the invention includes the following configurations: (a) when the first upper shaft housing portion incorporates the at least two upper rollers, the first lower shaft housing portion includes only one roller, and (b) when the first lower shaft housing portion incorporates the at least two lower rollers, the first upper shaft housing portion includes only one roller.

It is understood, however, that generally either or both of the upper shaft housing portion 120 and the lower shaft housing portion 130 may include one or more of the corresponding wear surfaces and pairs of rollers (as will be discussed in more details below), each of which is judiciously dimensioned to maintain the nominal orientation of the shaft assembly 110 with respect to the rack assembly 140. The upper and lower shaft housings 120, 130 may also include various additional wear surfaces and house or encase at least one bearing (these elements, which are not shown in FIG. 1A, are described below with reference to FIG. 1B).

The rack assembly 140 is shown with various holes to allow the rack assembly to be secured to an external object or structure (not shown) in order to enable this object or structure to be translated along the long axis of the rack 142. The recess profile 144 has a top surface structure 146 (which is shown to form of a roof of the recess profile 144) and a floor structure 148. Either—but preferably both—of the top surface structure 146 and the floor structure 148 are configured to form or are dimensioned as an U-shaped channels, in which the corresponding pairs of rollers and/or wearing surfaces of the upper and lower shaft housings are placed while meshing the pinion 106 with the rack 142. FIGS. 1A and 1B illustrate a specific example when only the floor structure 148 of the recess 144 is dimensioned as an inverted U-shaped channel (or U-channel, for short) that opens downwardly. As can be seen from the comparison of FIGS. 1A and 1B, such U-channel is appropriately dimensioned to accommodate the rollers 132 and/or the intermediate material block with the wear surface 134, to allow these multiple rollers and/or wear surface slide along and inside the U-channel 148 during the translation of the pinion 106 along the rack 142.

Figure 1D:
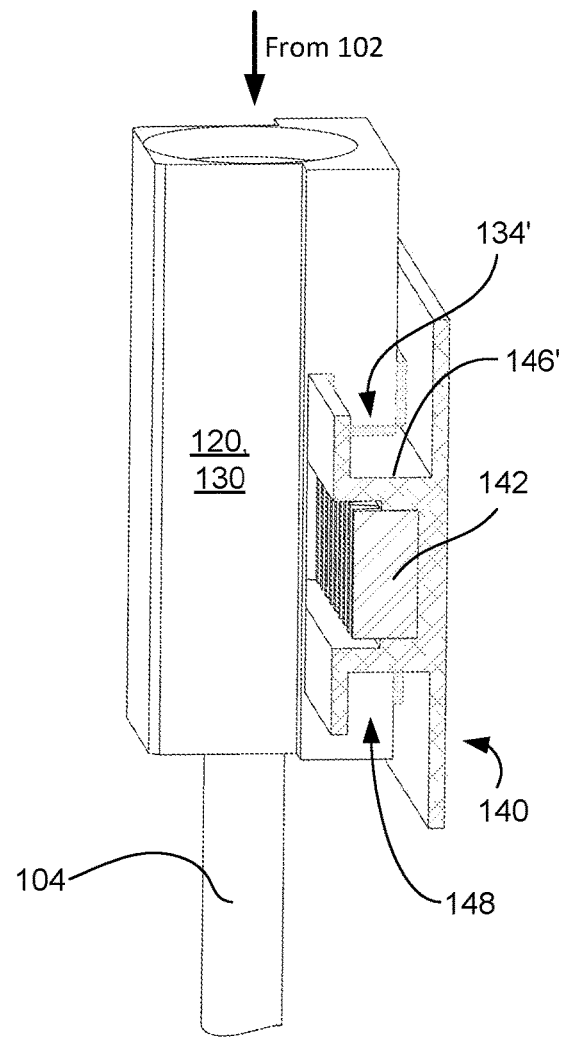
FIG. 1D is a schematic illustration of a portion of an embodiment in which the rack assembly forms U-shaped channels at locations both above and below the rack gear to accommodate at least one of a combination of multiple rollers and a wear surface of the upper and lower shaft housings, respectively.

In a related implementation, both the top structure 146 and the floor structure can be configured to form respectively-corresponding U-shaped channels. This preferred situation is schematically shown in FIG. 1D, in which the top surface structure is shaped as the U-channel 146' (dimensioned to accommodate the wear surface 134' of the upper shaft housing 120; no rollers are shown in this simplified example) that opens upwardly, while the floor structure 148 is dimensioned as an inverted (opening downwardly) U-channel as well. The simplified illustration of FIG. 1D shows that the U-channel 148 accommodates the corresponding wear surface of the lower shaft housing 130 while the pair of rollers are not indicated for simplicity of illustration.

FIG. 1B is a hybrid cross-sectional perspective view with cutaways, illustrating certain features of the embodiment of FIG. 1A in greater detail. In particular, portions of the upper shaft housing 120 are not shown (removed from FIG. 1B) to provide a clear view of the pinion 106. As shown, the pinion 106 has a main body with teeth configured to engage with the teeth of the rack 142 as well as a collar immediately above the teeth. In some embodiments, the shaft 104 may be disposed to pass through a circular opening in the pinion 106. The shaft has a key (not pictured), which fits into a slot (not shown) in the pinion 106. The shaft 104 is encircled by a bearing 126, both to help maintain the alignment of the shaft 104 within the upper shaft housing 120 and to reduce the wear-out of the shaft 104 during the operation of the sliding mechanism. In some embodiments, the shaft 104 may be optionally encircled by additional bearings (such as bearing 136, for example, indicated to reside within the lower shaft housing 130).

FIG. 1B also more clearly shows one of the at least two rollers 132, which is coupled to the lower shaft housing 130 in at least one embodiment. Also shown adjacent to the roller is a material block with the lower wear surface 134, which protrudes from the lower shaft housing 130. The lower wear surface 134 provides a stop against excessive vertical (in the coordinate system of FIG. 1B; that is in a plane containing the shaft 104) displacement of the rack assembly 140 (and particularly rack 142) relative to the shaft assembly 110 (and particularly the pinion 106). In preferred embodiments, the wear surface 134 is either constructed from a material softer than that of the area of the channel 148 (which the wear surface is designed to contact) and/or is coated with such softer material. In some embodiments, the rigidity figure of this softer material forming the wear surface 134 is judiciously chosen to reduce friction between the wear surface 134 and the channel 148. Although depicted as a continuous portion of the lower shaft housing 130, the material block having he lower wear surface 134 may be configured as a separate object that couples to the rest of the lower shaft housing 130. It should be appreciated that the features of the wear surface 134 described above confer certain advantages, among which there are directing or redistributing a greater degree of operational wear to a part that is more easily accessed for service, and allowing an exhausted wear surface to be replaced (or recoated), thereby greatly extending the operational lifetime of the overall support mechanism.

Referring yet again to the specific but non-limiting example of FIG. 1B, when the shaft assembly 110 is operably coupled to the rack assembly 140, the rollers 132 (and/or the wear surface 134) rest within the channel 148 of the rack assembly 140. The multiple rollers 132 is configured to roll or move along the channel 148, thereby reducing friction and allowing the motor gearbox assembly 102 to more efficiently drive or effectuate the linear motion of the rack assembly 140 relative to the shaft assembly 110. As has been already alluded to above, the rollers 132, acting in cooperation with the walls of the channel 148, also serve to keep the shaft assembly 110 (and particularly the pinion 106) in substantially-unperturbed operational alignment with the rack 142, thereby countering any reactive back-torque on the rack 142 during operation of the motor assembly 102 as well as any external torques. The use of the combination of the either upwardly or downwardly looking U-shaped channel of the top surface structure 146 (when present) with the corresponding multiple rollers and/or wear surface(s) of the upper shaft housing—see FIG. 1D—aim to achieve the same goal.

The specific example illustrated in FIG. 1B also shows an upper wear surface 124 on the upper shaft housing 120. Similarly to the situation with the lower wear surface 134, this wear surface 124 also serves as a mechanical stop against excessive vertical displacement of the rack assembly 140 relative to the shaft assembly 110. In preferred embodiments, the upper wear surface 124 is formed from a material chosen to reduce friction between the wear surface 124 and the channel 148 and softer than that of the roof 146 formed by the recess 144. Although depicted as a continuous portion of the upper shaft housing 120, the upper wear surface 124 may be configured as a separate object that couples to the rest of the upper shaft housing 120. It should be appreciated that the features of the upper wear surface 124 described above confer similar advantages to those discussed above in connection to the lower wear surface 134.

Additional details concerning the multiple rollers of the upper shaft housing and/or the lower shaft housing, the wear surfaces 124 and 134, and the lower shaft housing 130 are visible in FIG. 1C that presents an isolated perspective view of the lower shaft housing 130. In particular, FIG. 1C clearly shows both rollers 132 positioned on either side of the lower wear surface 134, which extends or located at a level above the height of the rollers 132, ensuring that the rollers 132 do not contact the floor 148 of the rack assembly 140 during the operation of the system 100. The rollers 132 are pictured as conventional cam followers, but other devices or configuration are also suitable in a given embodiment. (Understandably, rollers of the uppers shaft housing 120, when present to move in the U-channel that may be formed by the top surface structure 146 of the rack assembly 140, are configured in a similar fashion with respect to the surrounding structural features.)

It is appreciated, therefore, that one advantage provided by the use of the design discussed above is the way gear pitch circle alignment is maintained between the pinions 106 and the racks 142. This is accomplished in certain embodiments by providing cam follower type bearings (as bearings 136) in the pinion housings that run inside the U-shaped channel 148 formed in the rack assembly 140. These cam follower type bearings in the pinion housing are fore and aft of each pinion 106 and prevent each pinion from being pushed in or out relative to the corresponding rack 142.

With the advantage of the above-presented discussion, a skilled person will not readily appreciate that an embodiment of a sliding support mechanism configured according to the idea of the invention includes at least a first rack having a first translational axis, a first upper sliding surface and a first lower sliding surface, and satisfies at least one of the following conditions: a) the first upper sliding surface defines an first upper U-shaped channel having a first upper height and a first upper width; and b) the first lower sliding surface defining a first lower U-shaped channel having a first lower height and the first lower width. The embodiment also includes a first pinion assembly containing a first pinion that is coupled to the first rack; a shaft defining the main axis and having a first end and a second end (the shaft being coupled to the rotor at the first end of the shaft); and a first upper shaft housing and a first lower shaft housing proximal to the first pinion. Here, the first upper shaft housing is configured to engage the first rack above the first pinion and the first lower shaft housing is configured to engage the first rack below the first pinion while satisfying at least one of the following conditions: i) the first upper shaft housing comprises at least one of: a first wear surface configured to laterally slide on the first upper sliding surface of the first rack and at least two upper rollers configured to run within the first upper U-shaped channel; and ii) the first lower shaft housing comprises at least one of: a second wear surface configured to laterally slide on the first lower sliding surface of the first rack and at least two lower rollers configured to run within the first lower U-shaped channel. At least one of the sliding surfaces may be formed from a material the hardness of which is different from the hardness of the material forming at least one of the wear surfaces. A separation between the first and second wear surfaces along the main axis of the shaft is judiciously dimensioned to limit a displacement of the first upper shaft housing and the first lower shaft housing along this main axis to maintain operable engagement between the first pinion and the first rack along the main axis during an operation of the mechanism. Neither of the U-channels present in the rack of the sliding mechanism of the embodiment opens or is facing laterally (that is, in a direction transverse to the axis of the shaft)—to the contrary, each of the present U-channels opens or is facing either upwardly or downwardly (that is along the axis of the shaft).

Figure 2:
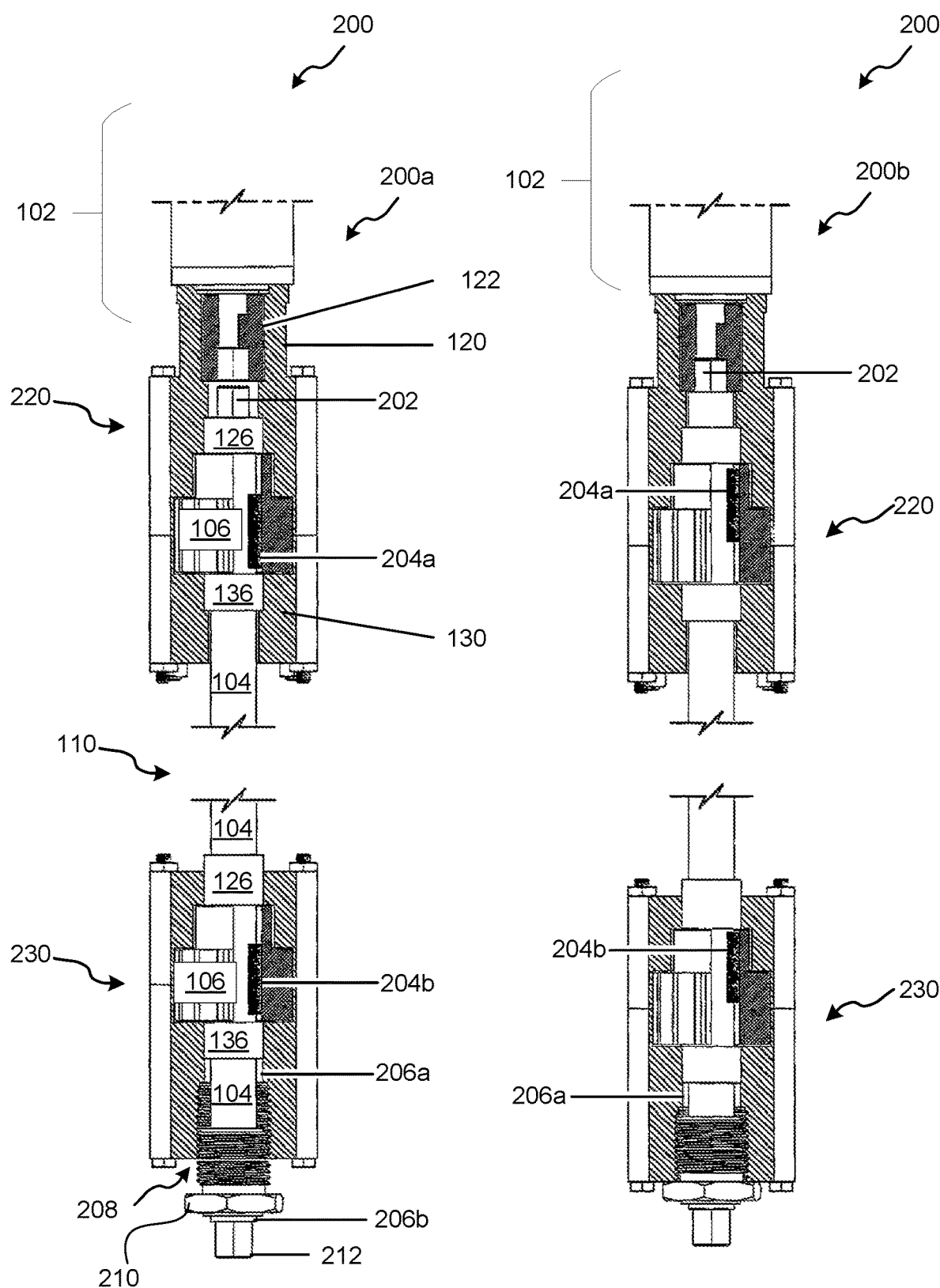
FIG. 2 is a cross-sectional view of an embodiment in two different configurations: the one in which the shaft and the motor assembly are engaged, and the one in which these are disengaged.

Examples of Structures Configured to Enable Simple Engagement and Disengagement of the Shaft with/from the Motor Assembly The shaft assembly 110 with a pair of pinions 108 and a corresponding pair of rack assemblies 140 (each having a rack 142 and other elements described above) can be implemented in various ways. FIG. 2 shows one such implementation 200 (in which only the shaft assembly 110 is shown), illustrated in two different configurations, 200a and 200b. Together, these configurations illustrate a key feature of preferred embodiments: the ability to manually disengage the shaft 104 from the motor gearbox assembly 102 (not pictured in FIG. 2). To simplify the understanding of the differences between the two configurations, only those structural elements that are arranged differently in configurations 200a and 200b are labeled for configuration 200b. Although the components of shaft assembly 110 may be provided as discrete parts of sub-assemblies, portions of the foregoing discussion will describe shaft assembly 110 in a fully assembled state.

Specifically, FIG. 2 illustrates a specific embodiment 200 (in which the shaft assembly 110 includes an upper pinion assembly 220 and a lower pinion assembly 230) in two configurations 200a and 200b, and in which the shaft 140 is cooperated with the motor assembly with the use of a motor coupling element. Here, the configuration 200a of the shaft assembly 110 illustrates the initial configuration or state of the cooperation between the shaft and the motor assembly (as it may be during the process of bringing the sliding mechanism together, when the shaft 104 is uncoupled from the motor coupling 122, but is retained within the shaft assembly 110). When the shaft assembly 110 is in configuration 200b, the shaft 104 is coupled to and operationally connected with the motor assembly 102.

Each pinion assembly (whether upper or lower) is structurally similar to the pinion assembly 112 discussed in reference to FIGS. 1A and 1B. Each of the pinion assemblies 220, 230 includes a corresponding pinion 106 as well as an upper bearing 126 and a lower pinion bearing 136 through which the shaft 104 passes. These components are housed jointly within the upper shaft housing 120 and the lower shaft housing 130 of that pinion assembly, which housings are coupled together. The shaft 104 is keyed in two locations, having an upper key 204a and a lower key 204b. These two keys (204a and 204b) fit into a recess (not shown) in each pinion 106, coupling the shaft 104 to each pinion 106 when the shaft 104 rotates. Additional detail of the pinions 106 and keys (204a, 204b) are discussed below, and are visible in greater detail in FIG. 3.

The keys 204a and 204b are each made shorter than the overall length of the pinion 106, thereby allowing the shaft 104 to translate up and down along a direction parallel to the length of the shaft assembly 110. The shaft passes through a fastener 210 at the bottom of the shaft assembly 110. The fastener 210 both holds the shaft 104 in place and allows the vertical (in the coordinate system of FIG. 3A) position of the shaft 104 to be adjusted to engage the shaft 104 with the motor coupling 122 or disengage it from the motor coupling 122, as described below.

The shaft 104 is provided with two annular extensions 206a and 206b, one or more of which may be attached to the shaft after the shaft 104 is passed through the fastener 210 and the bearings (124, 134) within the two upper shaft housing 120 and lower shaft housing 130. These annular extensions may be configured as known structures (such as split-rings or other suitable structures) and serve to widen the shaft 104 where the extensions are installed. In some embodiments, the shaft 104 may be provided with recesses dimensioned to receive the annular extensions. As shown, in FIG. 2, the annular extension 206a is placed just above the point at which the shaft 104 begins to pass through the top side of the fastener 210. The second annular extension 206b is placed at the point where the shaft 104 exits the bottom of the fastener 210.

It is appreciated that, when the shaft assembly 110 is initially in configuration 200a, the shaft 104 is uncoupled from the motor coupling 122, but is retained within the shaft assembly 110 by at least annular extension 206a pressing against the top of edge of the fastener 210. If and when the fastener 210 is inserted further into the aperture 208 in the bottom of the shaft assembly 110, the fastener 210 pushes against the annular extension 206a, thereby pushing the shaft 104 upwards toward the motor coupling 122.

When the fastener 210 is fully inserted into the aperture 208, the top end 202 of the shaft 104 is driven into the motor coupling 122, thereby coupling the shaft 104 to the motor 102 (not shown in FIG. 2). As depicted, the top end 202 of the shaft 104 resembles a hex bolt and is configured to mate with a correspondingly-shaped opening in the motor coupling 122. The fastener 210 may be a suitable structure such as a pin or bolt with a channel dimensioned to receive the shaft 104. In certain embodiments, the aperture 208 may be threaded and the fastener 210 may be configured with complementary threads. In these and other embodiments, the fastener 210 may be configured to have a hexagonal cap, thus enabling the fastener 210 to be inserted and withdrawn using standard tools such as a wrench or crank.

When the shaft assembly 110 is in configuration 200b, with the fastener 210 fully inserted into the aperture 208 and the shaft 104 coupled to the motor gearbox assembly 102, the shaft 104 may be disengaged from the motor gearbox assembly 102 by withdrawing by partially fastener 210 from the aperture 208. When the fastener 210 is withdrawn from the aperture 208, the top edge of the fastener 210 pushes downward against the annular extension 206b, thereby withdrawing the shaft 104 from the motor coupling 122, as indicated by the position of the top end 202 of the shaft 104 in configuration 200a. While the process of withdrawing the shaft 104 might allow the shaft to fall out of the motor coupling 122 under the influence of gravity, the presence of the annular extension 206b provides additional downward force to ensure that the shaft 104 disengages despite possible friction due to thermal expansion or slight flexion of the shaft 104 (which might otherwise prevent the shaft 104 from disengaging easily).

Notably, the keys 204a and 204b of the shaft 104 remain coupled to the pinions 106 in both configurations 200a and 200b. This coupling enables that the shaft assembly 110 (and particularly the pinions 106) to remain engaged with the rack assembly 140 corresponding to each pinion 106 and enables the rack assemblies 140 to move freely when they are pushed or pulled upon while the shaft 104 is disengaged from the motor assembly 102. Notably, even in configuration 200a, the shaft assembly 110 remains fully assembled. In the event of a motor failure, a user of the sliding support mechanism needs only to loosen the fastener 210 to restore (manual) functioning of the mechanism.

In certain embodiments, one or more of the keys 204a and 204b are configured to prevent each fastener 210 (and thus the shaft 104) from being completely removed from the aperture 208 when the shaft assembly 110 is fully assembled. In other embodiments, each fastener 210 may be provided with a visual indicator (such as a colored area, a line, or other marking) indicating how far the fastener 210 (and therefore the shaft 104) may be safely withdrawn.

Figure 3:
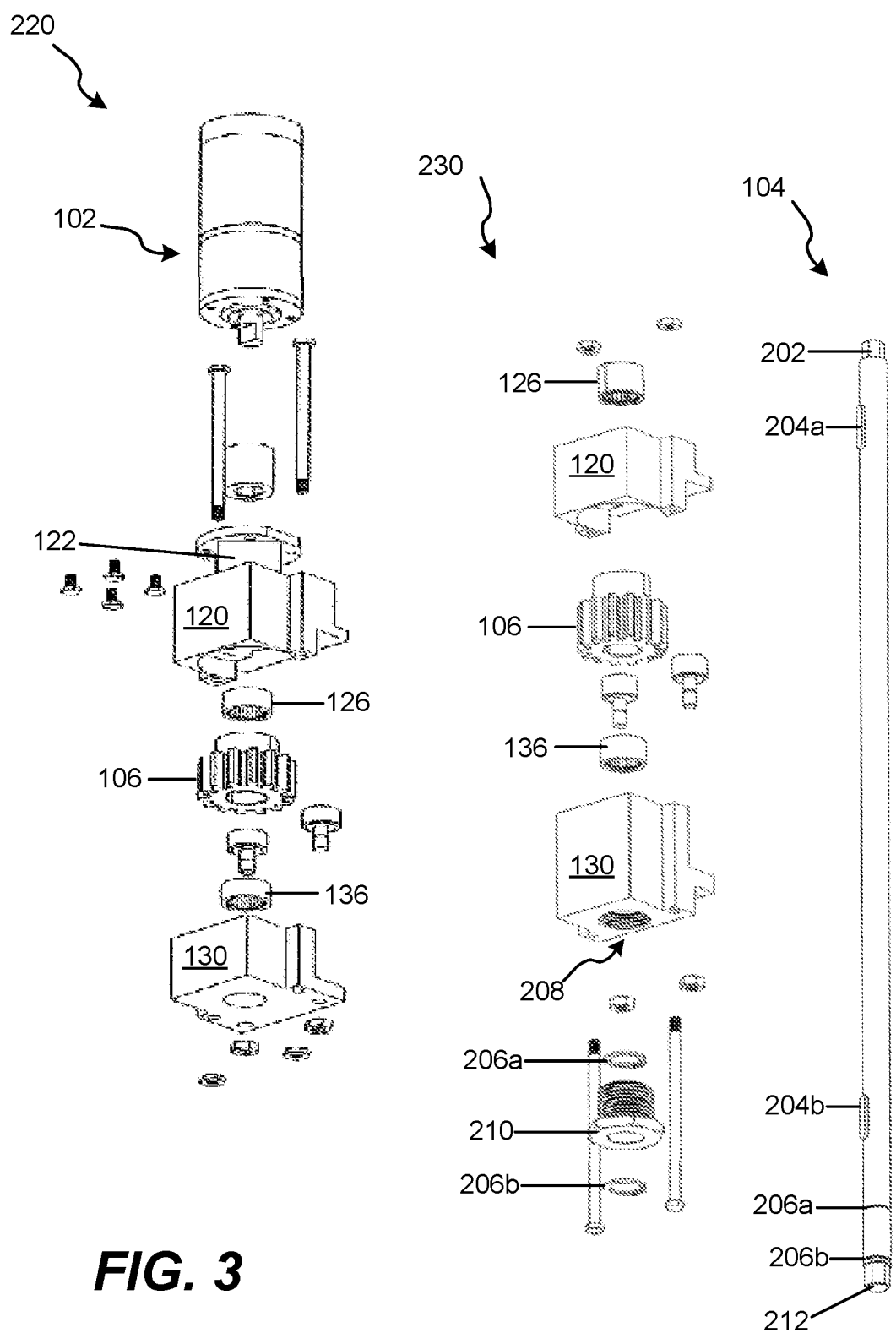
FIG. 3 presents exploded perspective views of selected elements and/or components of an embodiment of the sliding support mechanism shown in FIG. 1A and FIG. 2.

FIG. 3, in comparison with FIG. 2, depicts three structures: it presents exploded views of an example of the upper pinion assembly 220, an example of the lower pinion assembly 230, and an example of the shaft 104. Ancillary components such as screws may be shown, but not necessarily labeled. The upper pinion assembly 220 is shown with its corresponding upper shaft housing 120 and lower shaft housing 130, along with its pinion 106, upper bearing 126, and lower bearing 136. The motor coupling 122 is shown attached to the upper shaft housing 120 of the upper pinion assembly 220.

Similarly, the lower pinion assembly 230 is shown with its corresponding upper shaft housing 120 and lower shaft housing 130, along with its pinion 106, upper bearing 126, and lower bearing 136. Although in this Figure the shaft housings that belong to the lower pinion assembly 230 are also labeled 120, 130—that is, identically to those of the upper pinion assembly 220 they structurally differ as previously discussed. In particular, the lower shaft housing 130 of lower pinion assembly 230 is dimensioned to contain the aperture 208, which is configured to receive the fastener 210. Also shown are the annular extensions 206a, and 206b.

Also pictured in FIG. 3 is the shaft 104, with its top end 202 and bottom end 212. The keys 204a and 204b are shown on the surface of the shaft 104, and the locations of the annular extensions 206a and 206b are indicated (as previously described in reference to the lower pinion assembly 230).

During the operation of the system, or when the supported object is deployed, the racks 142 and pinions 106 of the upper and lower portions of the sliding mechanism may be and typically are subject to forces that will tend to cause misalignment leading to poor gear mesh, which in turn can result in structural damage and malfunctions. Accordingly, all elements of the mechanism are judiciously designed and structured to accommodate realistic amounts of displacement. For instance, grooves in each rack 142 are made deeper than the teeth of each pinion 106 are long, allowing each pinion 106 to remain fully engaged even if such pinion is displaced away from the corresponding rack 142. Similarly, the vertical extent (the length of the ridges and grooves) of the rack is larger than the vertical extent of the teeth of the pinions 106, thereby allowing the shaft 104 and pinions 106 to move up and down within an acceptable range while the pinions 106 remain fully engaged with each rack 142.

The technical discussions presented above allows the skilled artisan to appreciate the practical advantage provided by an embodiment of the invention. Indeed, the sliding mechanism of related art replaces the motor/brake threaded holes (intended to bolt the drive motor/brake to a drive housing) with four set screws loosely fitting in holes in the housing. There, an external screw (threaded through the wall channel and into a cooling slot in the motor/brake) keeps the motor engaged with the splined shaft assembly. It is this attachment design that enables removing the external screw and prying the motor/brake up manually, disconnecting it from the splined shaft assembly and allow the pushing the slide-out in manually from outside the RV. By contrast, the disclosed embodiments of FIG. 2 allow for bolting the motor assembly 102 solidly to the upper pinion assembly 220 and provide a secondary means for disconnecting the motor from the pinions 106.

Specifically, the discussed embodiments offer a means of disconnecting shaft 104 from the motor assembly 102 to allow manual retraction of the slide-out at a discretion of the user (for example, when the motorized slide-out action is not possible for some reason). As discussed, the motor assembly 102 is connected to the shaft 104 using a standard fitted coupling (represented as motor coupling 122). In one specific example, the motor shaft extension may be round with a flat surface that mates with an internal flat surface in the coupling 122, and the end of the shaft 104 is machined to a hexagon shape to mate with the internal hex of the coupling (see FIG. 2, for example). To disconnect the motor assembly 102 from the shaft 104 the shaft 104 is simply withdrawn from the motor coupling 122. The coupling 122 is prevented from disengaging from the motor assembly 102. Drawing the shaft out of the motor coupling 122 causes disengagement of the shaft 104 and free movement of the slide-out. The upper and lower pinions 106 stay engaged with the shaft 104 because the internal keyways in the pinions 106 (see keys 204a and 204b and their positions within the pinions 106 in FIG. 2) are long enough to stay engaged when the shaft 104 is pulled out of the motor coupling 122. The end 212 of the shaft 104 (see FIG. 2) opposite the coupling end 202 is extended and machined for wrench flats to be able move the slide with a wrench when shaft 104 is disengaged.

Yet another advantage of certain embodiments of the proposed sliding support mechanisms is the use of replaceable low friction bearings for the bearings 126 and 136 in the assemblies (220, 230) that the shaft 104 turns in. The reaction of the gear force is carried in these bearings. Lowering this bearing friction increases the force available to drive the slide-out.

The skilled artisan will now readily appreciate that, the embodiment of the sliding support mechanism may generally include a motor gear-box assembly with a rotor and have the first end of the shaft coupled to both the rotor and to the first pinion. The embodiment may additionally include a bearing configured to receive the shaft and encircle the shaft at a point between the rotor and the second end of the shaft; and a lower pinion assembly that includes an aperture that is configured to receive the second end of the shaft with the use of a fastener such that in a first state of the sliding mechanism the fastener is positioned in the aperture such that the shaft and rotor are engaged; and in a second state this fastener is withdrawn by at least a fixed distance from the aperture, thereby disengaging the first end of the shaft from the rotor such that the first rack translates freely along the first translational axis when a force is applied to the support mechanism in a direction parallel to the first translational axis.

Figure 4:
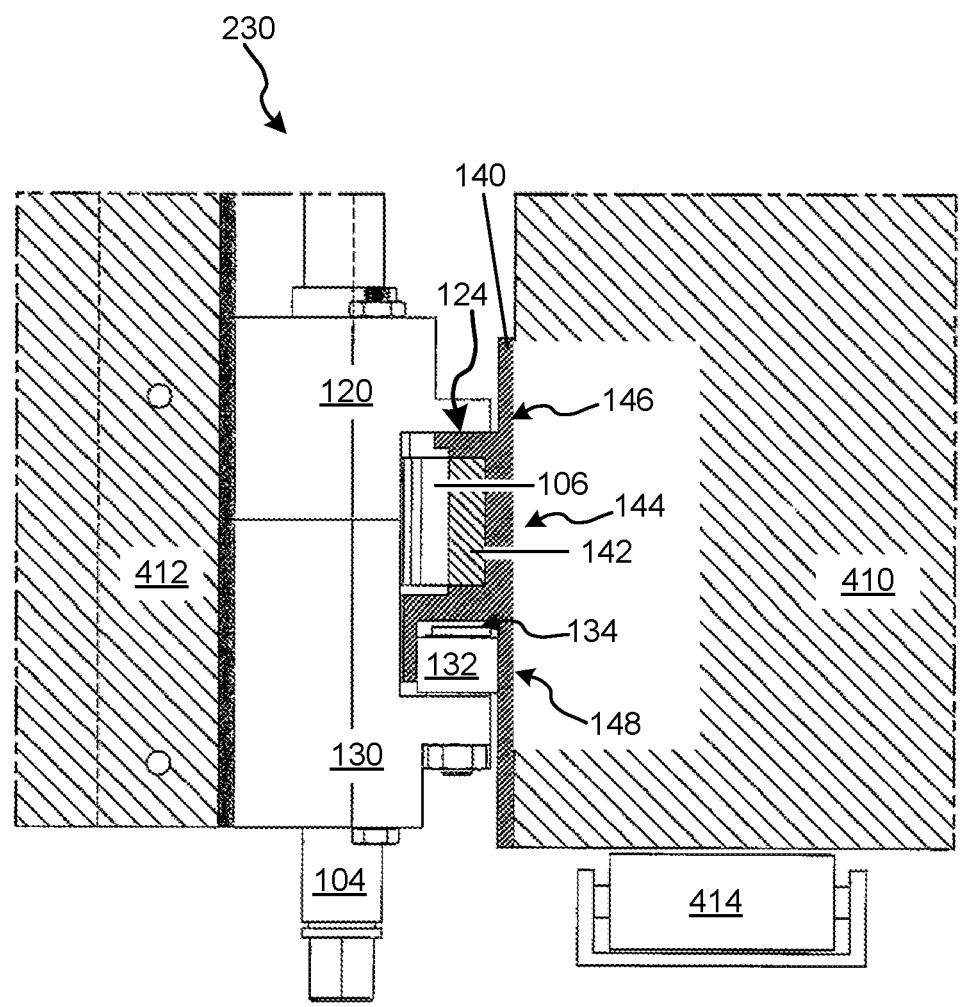
FIG. 4 is a cross-sectional view of a related embodiment.

Examples of Solutions Configured to Accommodate the Irregularities and/or Roughness of a Surface Supporting the Slide-Out Unit During Operation of the Sliding Mechanism FIG. 4 is a cross-sectional view illustrating elements of some embodiments presented above. FIG. 4 depicts a portion of the sliding support mechanism 100 (in which only the floor structure 148 of the rack assembly 140 is shown to form the U-channel, for simplicity of illustration). This example depicts a lower pinion assembly 230 engaged with a rack assembly 140. In this example, the shaft assembly 110 (represented by only the lower pinion assembly 230) is attached to shaft assembly mount or a specifically-spatially-profiled rail 412 allowing it to be integrated into a larger structure (not shown; in practice, the rail 412 is affixed to the wall of an RV). The rack assembly 140 is shown coupled to a frame 410 of an object (not shown; in practice, the object with the frame 410 may represent the slide-out portion of the RV) to be supported. The object (not shown) may also be partially supported from below by a roller or conveyor 414. This example illustrates an application in which the mechanism 100 may be subject to external forces. For instance, if the shaft assembly 110 is rigidly coupled to a larger structure using the shaft assembly mount support structure or rail 412, and the frame 410 of the object being supported is not perfectly flat, the mechanism 100 will be subject to varying vertical displacements as the object slides in and out with respect to the rail 412 over the protrusions from and dips in the lower edge surface of the frame 412. These and other displacements are managed as described above in connection to FIG. 1B.

Some preferred embodiments include two pairs of mutually parallel rack assemblies 140, each pair disposed on one side of a sliding object. For example, the object being supported may be an RV slide-out with one pair of racks on each sidewall. In this example, shaft assemblies would be fixed to the sidewalls of the RV (either within recessed compartments or structures such as supporting rails protruding from the exterior walls of the RV). An example application of one such embodiment is shown in FIG. 5A.

Figure 5A:
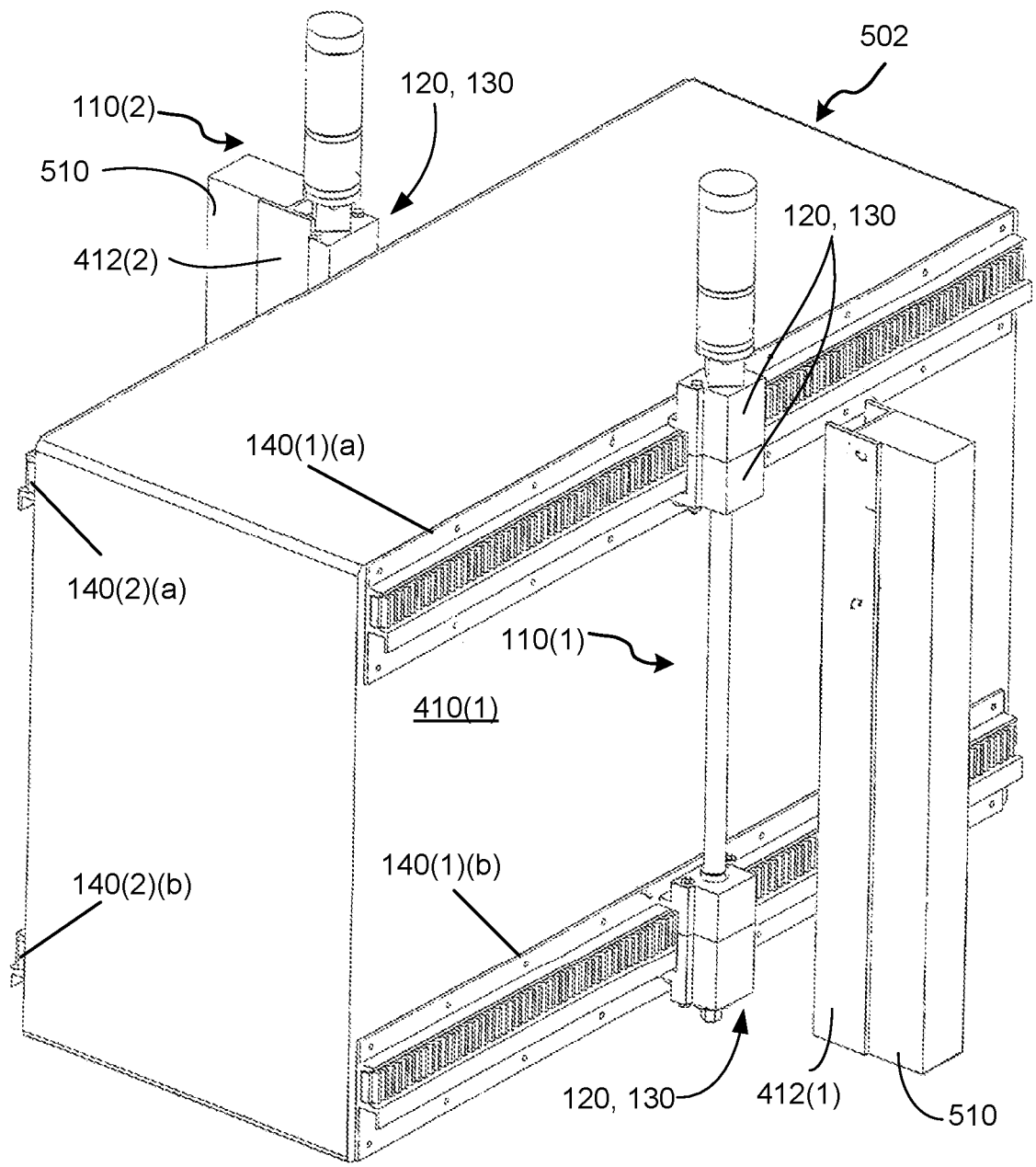
FIG. 5A is perspective view of an example of application of a related embodiment, showing the spatial coordination between the upper and lower shaft housing portions of the shaft assembly and the rails structure slidingly supporting the housing portions in the outside wall.

In the example of FIG. 5A, the frame 410 belongs to an RV slide-out 502. The slide-out 502 has a corresponding frame 410 on two sides, labeled 410(1) and 410(2) for clarity. Each of these frames 410(1), 410(2)—and, therefore, the object 502—is supported by a corresponding slide-out mechanism. There are two slide-out mechanisms shown— one on each side of the object 502. Each of the slide-out mechanisms includes a corresponding shaft assembly 110 (these are, accordingly, labeled 110(1) and 110(2)) respectively coupled to a corresponding pair of rack assemblies 140. The individual corresponding rack assemblies are labeled 140(1)(*a*) and 140(1)(*b*) on the right side of the object 502, and 140(2)(*a*) and 140(2)(*b*) on the left side of the object 502. Each shaft assembly 110 is configured to couple to the corresponding shaft assembly (mount) support structure or rail 412 that is affixed to the wall 510 of the RV. These two rails are labeled 412(1) and 412(2) (one on each side of the slide-out object 502. Each shaft assembly support or rails 412 is shown as a mount having a spatial profile configured to couple to and accommodate the corresponding shaft assembly 110 (specifically, the shaft housing portions 120, 130) in it and further configured to be installed within the walls of an RV (shown as 510). In FIG. 5A, the upper and lower shaft housings 120, 130 of the shaft assembly 110(2) on the left side of the object 502 are shown to be inside and accommodated by the spatial groove of the rail 412(2), while on the right side of the object 502 the housings 120, 130 are shown to be separated and removed from the accommodating rail 412(1).

It now becomes clear that an additional advantage is realized by allowing the pinion assemblies (220, 230)—and, therefore, upper and lower shaft housing portions 120,130— to float in an unimpeded fashion up and down, together with the slide-out. This degree of freedom becomes practically important since up and down movement is forced upon the slide-out when the slide-out (represented schematically by object 410 of FIG. 4, or object 502 of FIG. 5A) during the sliding out or sliding in movement on the supporting element (for example, rolling on rollers represented schematically A 414 in FIG. 4) does not move perfectly in plane with the pinion housing assembly fastened to the outside wall via the rail 412. This unimpeded vertical movement is provided for and ensured by complete lack of any contraption configured to affix the housings 120, 130 in and with respect to the rail 412. In other words, in stark contradistinction with the use of fasteners and wedging elements used to cooperate the sliding mechanisms of related art with the rails structures supporting such sliding mechanisms on the outside walls while impeding or even completely preventing the up-and-down movement of the pinion assemblies within such rails, the suspension of the embodiments of the sliding mechanisms of the invention in such rails are completely devoid of any fasteners or wedging elements.

The loose fit of the pinion assemblies 220 and 230 with the wall mounting channel or rail (see 412(1), 412(2) in FIG. 5A) allow in and out and up and down movement as described earlier. In and out movement translates to side to side movement of the slide-out. Allowing for this is important since the slide which is rolling on rollers beneath it may be steered left or right as the slide-out is retracted or extended. If the slide-out is steered to press one bearing housing of the bearings 132 into the channel 148 causing it to bottom out in the channel 148, gear alignment is still maintained by the bearings 132 in the pinion assembly (i.e., 220 or 230) pushing against the rack assembly 140 and forcing the slide-out to be pushed away. Similarly, on the opposite side of the slide-out, the bearings 132 on the opposite side pull the pinion assembly (220 or 230) out of the channel 148 while still maintaining proper gear mesh. Secondarily, the force of the drive motor acting between the pinions 106 and the racks 142 produces a twisting force on the pinion assembly (220, 230). This twisting is partially reacted against by the housing trying to turn in the wall channel but is also satisfactorily reacted by having fore and aft bearings 132 reacting against this twisting force.

Figure 5B:
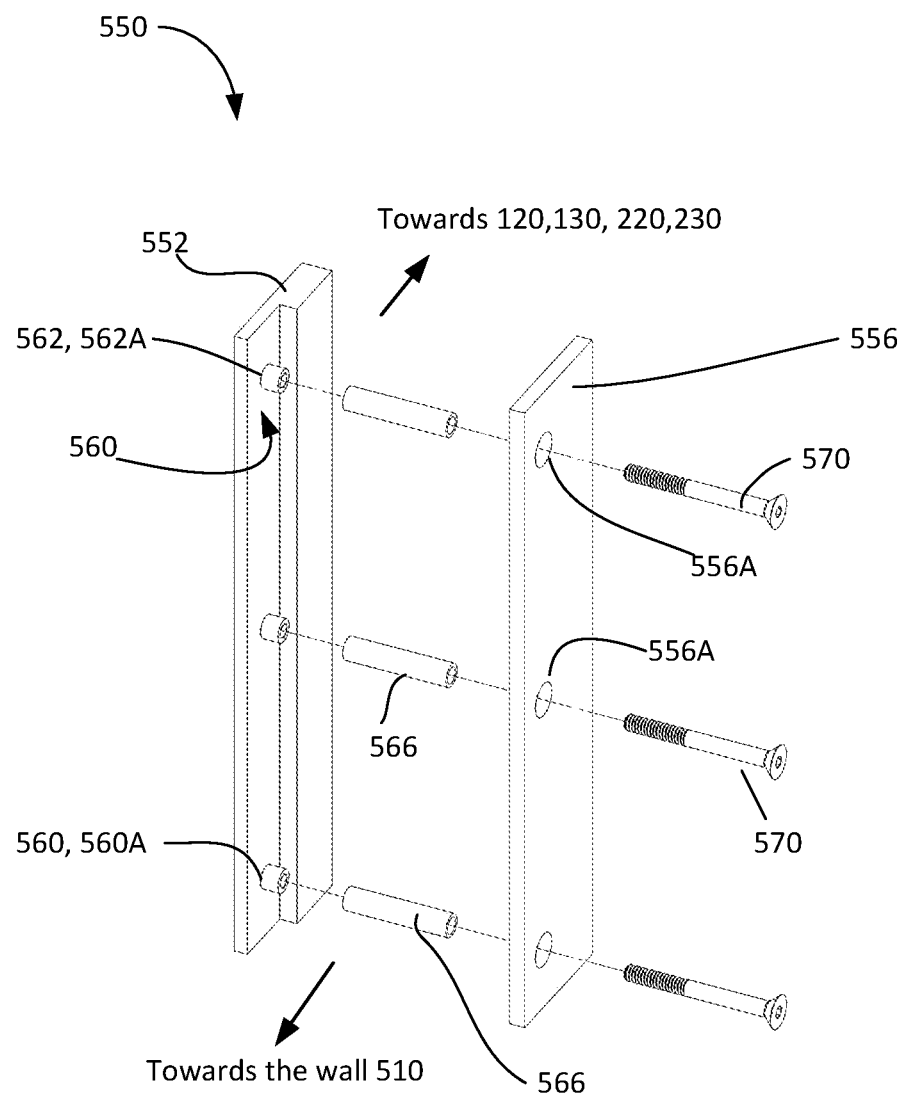
FIG. 5B illustrates a contraption for use during the repair of a rail supporting and carrying the shaft housing of the sliding support mechanism along a wall of the outside supporting structure

Notably, when as a result of repair or replacement of a portion of the sliding mechanism—for example, a repair of the pinion assembly (such as 220 or 230, or a pinion assembly of a mechanism of related art) or repair of the wall mounting rail 412—the unimpeded cooperation between the pinion assembly and the mounting rail 412 is frustrated, the mounting rail 412 can be simply replaced with a different contraption an example of which 550 is schematically shown in FIG. 5B. (In practice, the replacement of a portions of the sliding mechanism often manifests in practice in a mismatch of the outer dimensions of the pinion assembly and the inner dimensions of the channel of the mounting rail 412 that accommodates this assembly, and then the pinion assembly simply does not fit well into the original rail 412 anymore. It is this mismatch of dimensions that the use of the contraption 550 instead of the rail 412 successfully addresses.) Here, the rail 412 is replaced with two plates 552, 556 one of which may be structured to contain a recess or step 560, and one of which carries threads 562 either through the body of such plate or in a corresponding nut (as shown in FIG. 5B with 562A) attached to and protruding from the inner surface. The remaining plate (here, 556) contains throughout openings or apertures 556A spatially coordinated with the threads 562. In practice, the rail 412 is removed from the wall 510 and replaced with the structure 550, while three throughout holes are drilled through the thickness of the wall at separating distances corresponding to the distances separating the threads 562 from one another and at corresponding locations. The preferably metallic hollow sleeves, the lengths of which is approximately equal to the thickness of the wall 510, are inserted into the holes drilled in the wall 520, and the plate 552 is applied to one side of the wall 510 (with the nut protrusions 560A inserted into the holes in the wall) while the plate 556 is applied to the opposing side of the wall such as to spatially align the openings 556A with the hole in the wall now carrying the sleeves 566 therein and the threads 562. The replacement is accomplished with affixing the plates to the wall with the use of threaded fasteners 570.

Figure 7B:
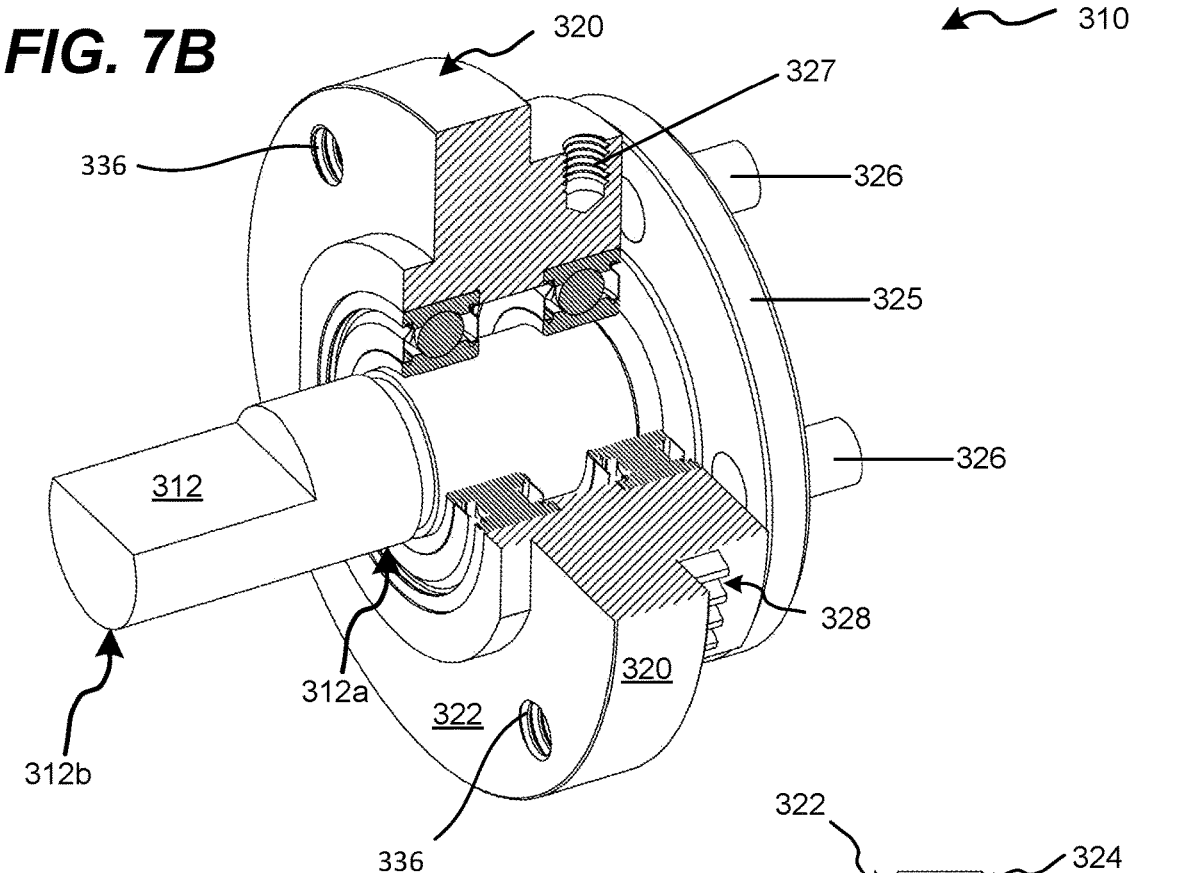

Improvements of Structural Cooperation Between the Motor Portion and the Rotor Portion of the Motor Assembly to Counteract Torque Created by the Motor During Operation Thereof It is the very practical use of the sliding support mechanism of the invention in the RV-environment that raises the question of unreliability of conventional motor assemblies 102 and presents a cause for defining a solution to improving the quality of such motor assemblies. To understand the situation better, the following description first presents the structural characteristics of the conventionally-configured motor assemblies 102. To this end:

FIG. 7A illustrates schematically an embodiment of the motor assembly 102, partially exploded to show a motor portion 302 (which contains the motor housing with the motor inside—not shown; and the set of gears or gear train 332) and a rotor portion or assembly 310. The rotor assembly is additionally detailed in FIGS. 7B and 7C, illustrating, respectively, a cut-out perspective view and a side view of the assembly 310.

Figure 7C:
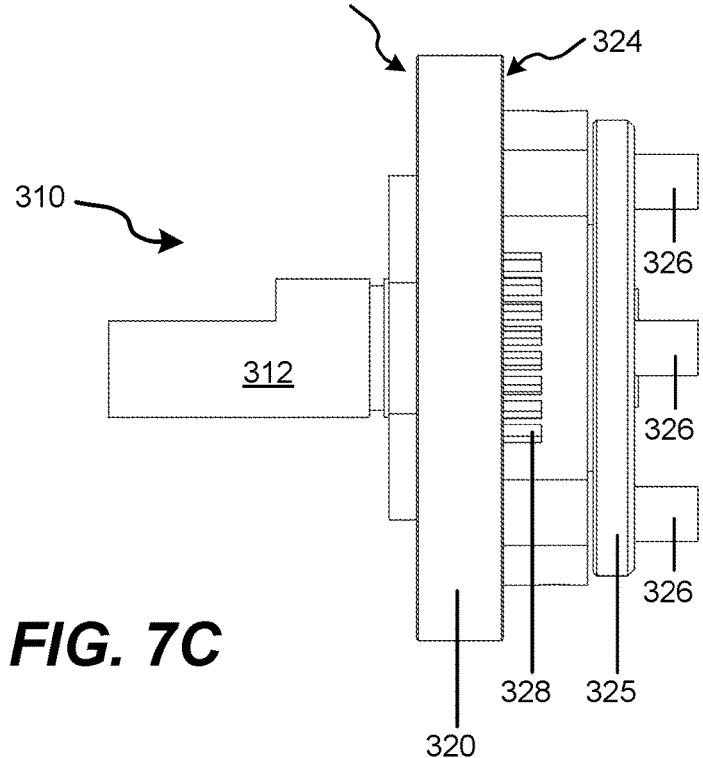

Referring now to FIGS. 7A, 7B, and 7C, illustrating a conventional structure of the motor assembly, used in related art: the motor gearbox assembly 102 contains a drive motor portion 302 (or, simply, drive motor, shown concealed in the typically-cylindrical motor housing), a planetary gearbox 304, and the rotor assembly portion 310.

The rotor assembly portion 310 is structured to include a bearing held in a respective housing, a rotor or shaft 312, and a faceplate or bearing housing 320, which has an outer face 322 and an inner face 324 and through which the rotor/shaft 312 (engaged with the faceplate 320 via the bearing) passes. The rotor 312 has a proximal end 312a and a distal end 312b. The rotor assembly 310 also includes a gear plate 325, that is coupled to the faceplate or bearing housing 320 (that encloses the bearing mechanism shown in FIG. 7B, that carries the threaded mounting holes 336).

The drive motor 302 contains an output motor shaft (not shown) with a gear fitted to the end of the shaft and caused to turn with the motor itself. The planetary gearbox 304 contains a set of multi-stage planetary gear 332 (arranged around a central gear 330), which in a typical embodiment of the motor assembly 102 is coupled to the motor of the drive-motor portion 302 and further to the rotor assembly or rotor portion 310, to transfer (in operation of the motor assembly) the motion and associated torque from the motor to the rotor/shaft 312.

As shown, the housing of the drive motor 302 has an outer surface 342, while the housing of the planetary gearbox 304 includes an inner surface 344, which may be structured to contain a relief structure. The surface 344 is provided with teeth designed to engage or mesh with the outside of the set of gears 332. The (typically cylindrical) housing of the planetary gearbox 304 is rigidly joined to the housing of the drive motor 302 by a fastener (shown as 329A), while the housing of the gearbox 304 is rigidly joined to the bearing housing of the rotor portion 310 with the fastener 329B (and thread or sets of threads 327).

The rotor assembly 310 may also include one or more sets of teeth 328 (not shown in FIG. 7A but visible in FIGS. 7B and 7C) disposed on an edge near the inner face 324 of the faceplate 320. The teeth 328 are configured such as to engage with the relief structure of the inner surface 344 when the leading end of the rotor assembly, which faces the gears 332 in FIG. 7A, is inserted into and coupled to the housing of the gearbox 304. After this is accomplished, the screw 329B is threaded through the corresponding opening in the housing of the gearbox 304 to secure the rotor portion 310 in its cooperation with the gearbox 304.

Notably, once the motor assembly 102 has been brought together and assembled (by affixing to one another the drive motor portion 302, the gearbox 304, and the rotor portion 310), the overall motor assembly is further cooperated with to be coupled to upper shaft housing 120 (at the motor coupling 122, for example, as shown in FIGS. 1A, 3A) using fasteners such as screws or bolts and the correspondingly threaded openings 336 in the face plate (or bearing housing) 320.

In operation, rotation of the drive motor output gear causes the planetary gear 332 to turn inside the housing of the gearbox 304. (Here, the stages of the gear in the multi-stage gear set 332 pass on the motion at a reduced speed and increased torque from stage to stage. For example, the second stage of planetary gearing contains the same mechanisms as the first stage, except the motor output gear is replaced with a gear similar to the central gear 330. Subsequent stages duplicate the second stage up to the output stage. The output stage replaces the gear 330 with the rotor/shaft 312 and transmits the power out through the end 312*b*.) The intent of this design is that motor 302, the gear housing 304, and bearing housing 322 are locked together with screws 329A and 329B and the overall assembly 102 is installed with attachment screws matching the threads in opening 336, thus creating rotation of the shaft 312 at low rpm and high torque.

The applications of the sliding mechanisms, utilizing the motor assembly(ies) 102 and aimed at repeatable repositioning of heavy loads over hundreds of thousands of times, required that the planetary gears of the gearbox 304 be appropriately designed to scale up the torque generated by the motor of the drive motor portion 302 up to the levels needed to rotate the rotor/shaft 312 of the assembly 310. In some embodiments, the torque transfer ratio from the motor to the shaft 312 may measure in hundreds. In other words, the ratio of the torque present at the rotor end 312 to intrinsic torque generated at the input of the gear set by the motor is at least 100, more often 300-500.

The use of such embodiments of motor assemblies in sliding support mechanisms of the invention leads to an unexpected situation when the connection between the housing of the gearbox 304 and the faceplate (or bearing housing) 320 of the rotor portion cannot withstand the high-level rotational torque transferred to the rotor end and "gives in" thereby making the motor assembly non-usable.

Phrased differently, industrial practice convincingly demonstrates that conventionally-structured motor assemblies 102 (described above and used in the sliding support mechanisms of the invention) often experience failure.

In particular, when such embodiments of the motor assembly 102 are used, the structural features such as the teeth 328 and at least the screw or fastener 329B (designed specifically to prevent the rotor assembly 310 from the rotational displacement with respect to the housing of the gearbox 304) become substantially inadequate for this purpose and are, effectively, stripped away or worn out to the point that the coupling between the teeth 328 and the relief of the surface 344 ceases to exist. When such operational condition is reached, the motor assembly 102 becomes effectively inutile for extending and retracting the target slide-out sections and as part of the sliding support mechanism.

That is, the failure of the teeth 328-relief surface 344 and the fastener 329B (which are subject of high torque delivered by the multi-stage planetary gear of the gearbox 304 from the motor of the drive motor portion 302 to the shaft 312) result in a separation of the housing of the gearbox 304 from the installed in it bearing housing 320, rendering the assembly 102 unusable. (To enable the reader to visualize this more clearly, consider rigidly bolting the bearing housing 320 with fasteners in holes 336 to a fixture and forcefully restraining the output shaft while powering the drive motor. The torque path goes through fasteners 329A and 329B and is reacted at the mounting fasteners 336. Since the fastener 329B is much higher stressed than the other connections, it fails first. This is the mode of failure practically seen in operation of RV slide outs.)

Embodiments of the present invention address this practical problem by providing a means of mounting the motor assembly at the housing of the gearbox 304 (instead of at the bearing housing 320), thereby eliminating the torque connection between the gearbox 304 and the bearing housing 320 from which the conventional design of the motor assembly 102 suffers. The proposed rotation-prevention and motor-assembly-to-upper-shaft-housing-attachment arrangement, is structured to extend outside of the outer surface of the conventional industrially-produced housing of the motor assembly (that is, to be separated from the surface structure 344 by a wall of the motor housing) and to avoid the use of the face plate (or bearing housing) 320 when attaching the motor assembly 102 to the upper shaft housing 120. In particular, embodiments of the present invention are configured to modify the already-produced, off-the-shelf conventional motor assembly 102.

Figure 6A:
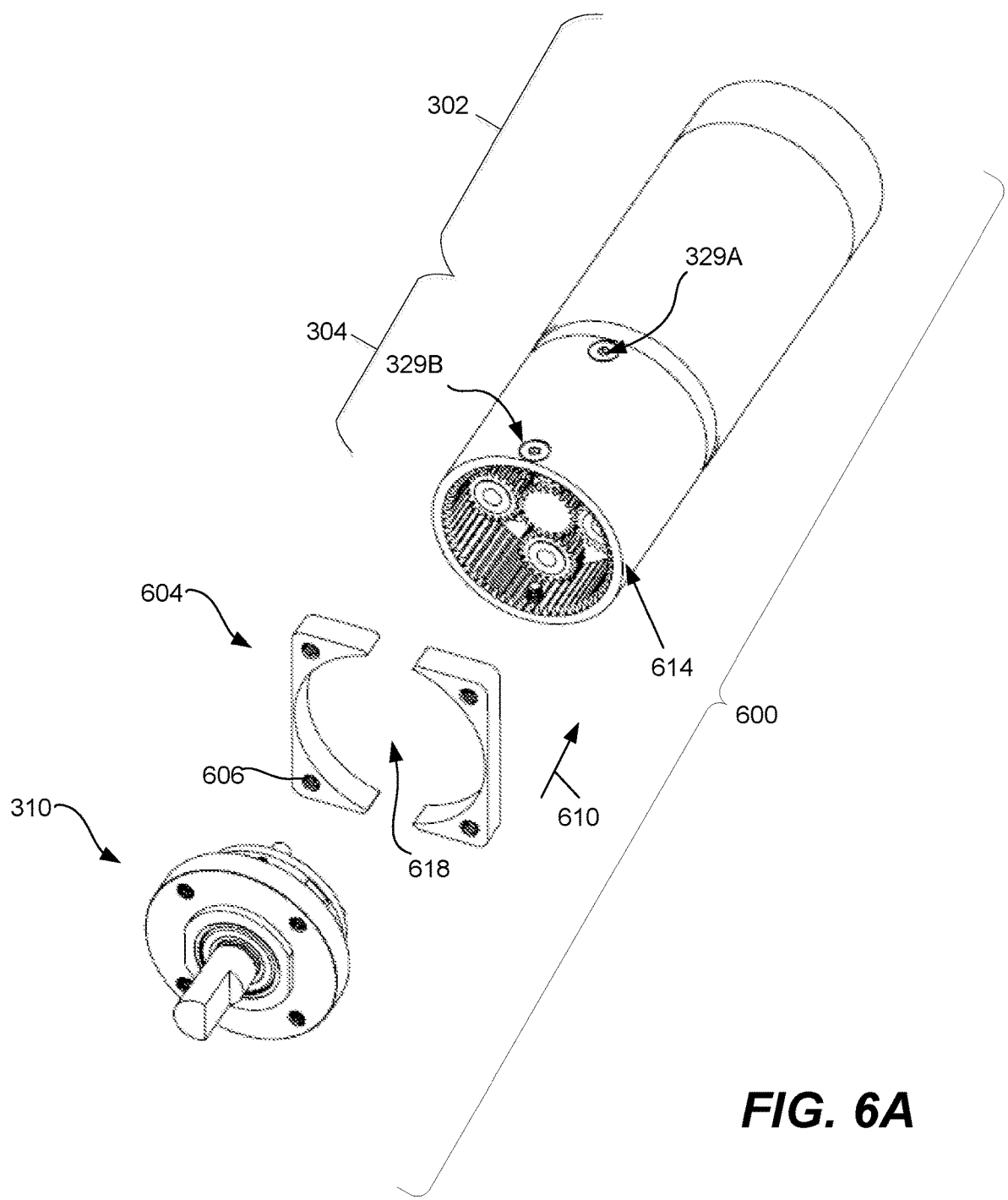
FIGS. 6A, 6B, and 6C present different views of portions of a modified motor assembly for use with the embodiment of FIGS. 1A, 3, 5.
Figure 6B:
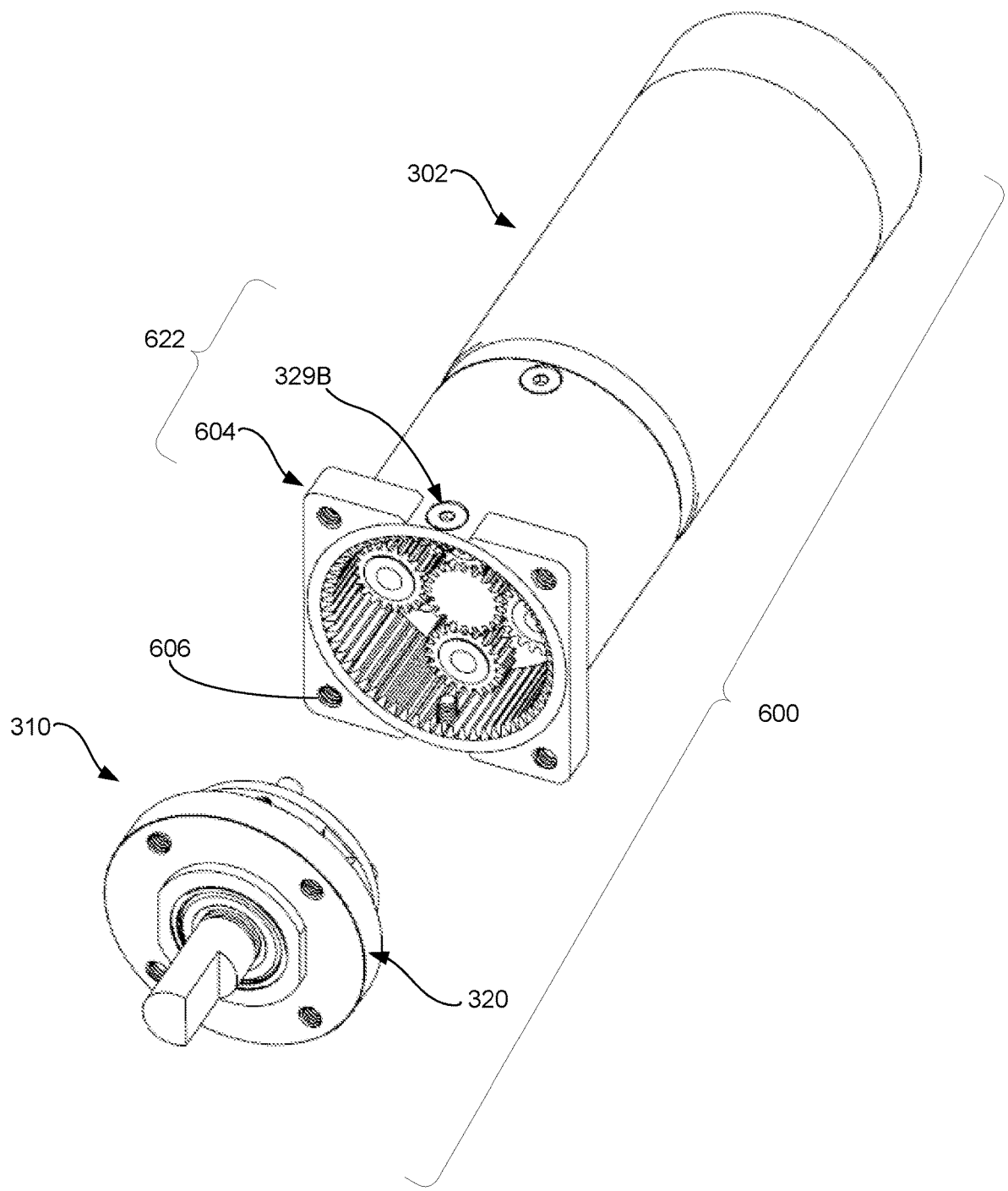
Figure 6C:
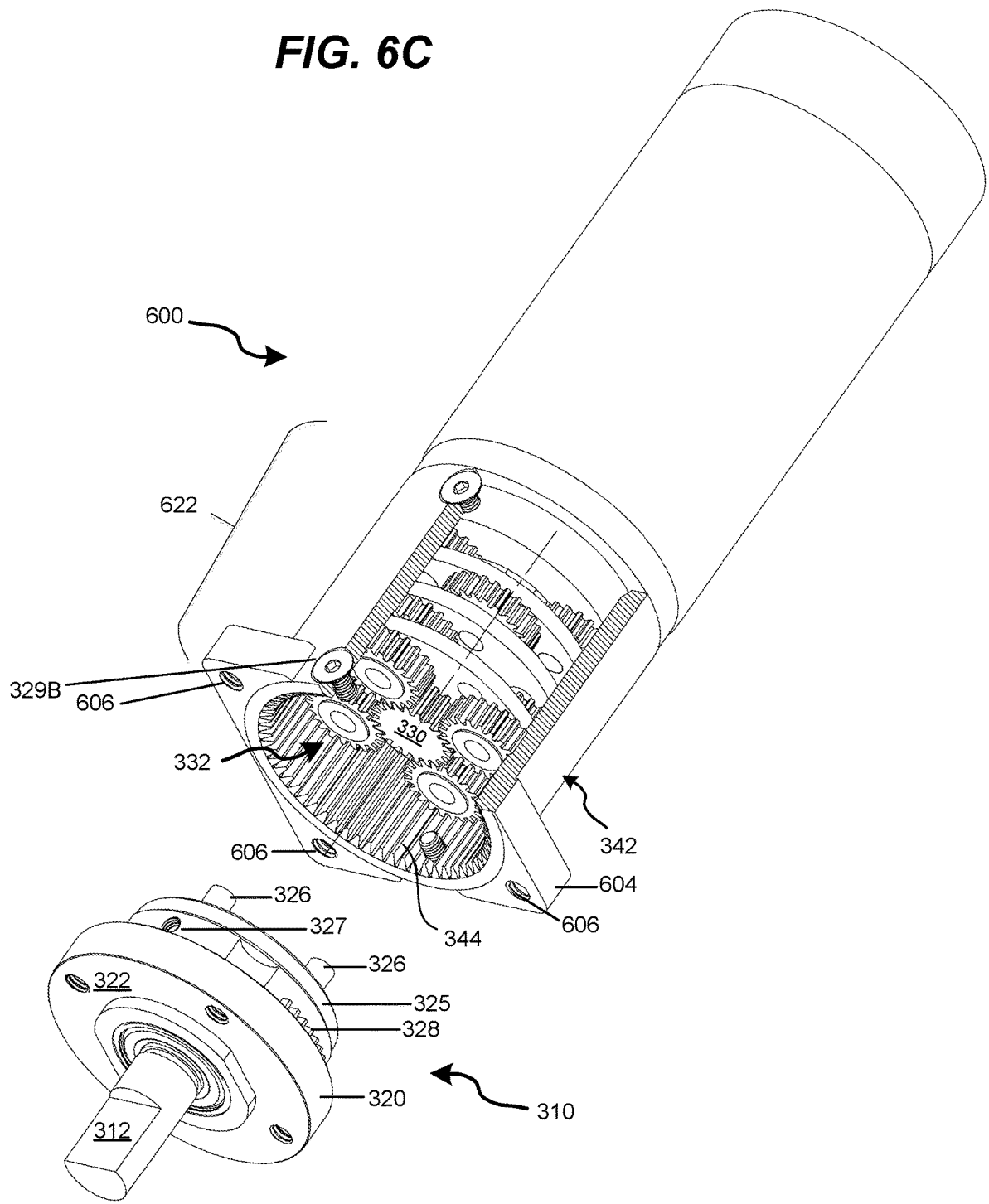

In reference to FIGS. 6A, 6B, and 6C, one non-limiting implementation 600 of the motor assembly specifically structured for use with an embodiment of the sliding support mechanism (FIGS. 1A, 3A, 5, for example) is discussed. A person of skill will immediately appreciate that operational advantage, provided by the structural differences between the embodiments 600 and 102, ensures that the exploitation of the sliding support mechanism that employs the assembly 600 remains intact for more than 3,100 cycles.

According to the idea of the invention and as shown in FIG. 6A, for example, the motor portion 302 of the conventional motor assembly 102 (and, specifically, the housing of the motor portion 102) is being judiciously modified by equipping the motor portion with an outside structural component. The chosen structure of the such outside component, in one implementation, is devised to spatially extend (in a radial direction as viewed from the axis of the motor component 302) beyond the limits of the housing and to provide for such a mechanism of connecting the motor portion 302 to the motor coupling 122 (of the embodiment of the sliding support mechanism of the invention, at the upper shaft housing 120, for example) that substitutes the conventionally-used connection between the gear plate 325 and the upper shaft housing 120 discussed above.

As shown in the non-limiting example of FIGS. 6A, 6B, 6C, the housing of the conventionally-implemented gearbox 304 may be provided or complemented with a collar 604 (shown in Figures as a combination of two distinct components with polygonal perimeters, but more generally configured as a single component with an aperture dimensioned to tightly fit or accommodate the housing of the gearbox 304 in it). In practice, the conventional off-the-shelf motor assembly 102 is disassembled to separate the constituent portions 302+304, 310 from one another, and collar 604 is slid onto (as shown schematically with an arrow 610 in FIG. 6A) and attached to and outside of the housing of the gearbox 304 along its perimeter, at or near the edge 614 of the housing facing the rotor portion 310 (see FIG. 6B). To ensure the tight fit between the collar 606 and the housing of gearbox 304, the curvature of the opening 618 of the collar 606 is judiciously defined to be substantially matched to that of the outer surface of the housing in question. Regardless of whether the outer diameter of the faceplate or bearing housing 320 is substantially equal to or exceeds the outer diameter of the housing of gearbox 304 at this edge 614, the collar 604—once positioned at the edge 614—does not interfere with the plate 320. Once the collar 604 is appropriately cooperated with the gearbox 304 (and care is taken to keep the heads of the fasteners unobstructed), it is irremovably/permanently affixed to the housing of the gearbox by, for example, welding these two components to one another along an edge of the opening 618, to form a modified gearbox 622. (In one alternative, the housing of the gearbox 622 may be cast or machined with the collar 604 being an integral part of this housing.) The process of forming the modified motor assembly 600 is then completed by affixing the rotor portion 310 to the gear box 622 by sliding the leading portion of the portion 310 into the opening of the housing of the gearbox 622, meshing the teeth 328 with the surface relief 344, and affixing the housing of the gearbox 622 to the faceplate 320 with the use of the fastener 329 (in a fashion analogous to that of affixing the rotor portion 310 to the gearbox 304 of the embodiment 102, that was discussed above).

Notably, according to one implementation of the idea of the invention, the collar 604 may be equipped with openings 606, configured in a fashion similar to that of the openings 336 of the faceplate 320 of the conventionally-complemented motor assembly 102. If this is the case, the openings 606 are disposed at such radial distance from the axis of the gearbox 622 as to allow for mechanical coupling of the housing of the gearbox portion 622 to the upper shaft housing 120 (at the motor coupling 122, for example) using fasteners such as screws or bolts while, at the same time, by-passing the faceplate 320. Notably, as a result of such mechanical coupling, the faceplate or bearing housing 320 of the rotor assembly 310 is operationally decoupled from the amplified torque, transferred from the motor to the rotor/shaft 312 while, at the same time, maintaining its bearing function. The dimensions and construction of the collar 604 and its openings 606 may be chosen based on the torques the parts must withstand in order to prevent wear and failure of the coupling between the rotor assembly 310 and the motor housing 302 for particular motor and gear configurations.

Figure 6D:
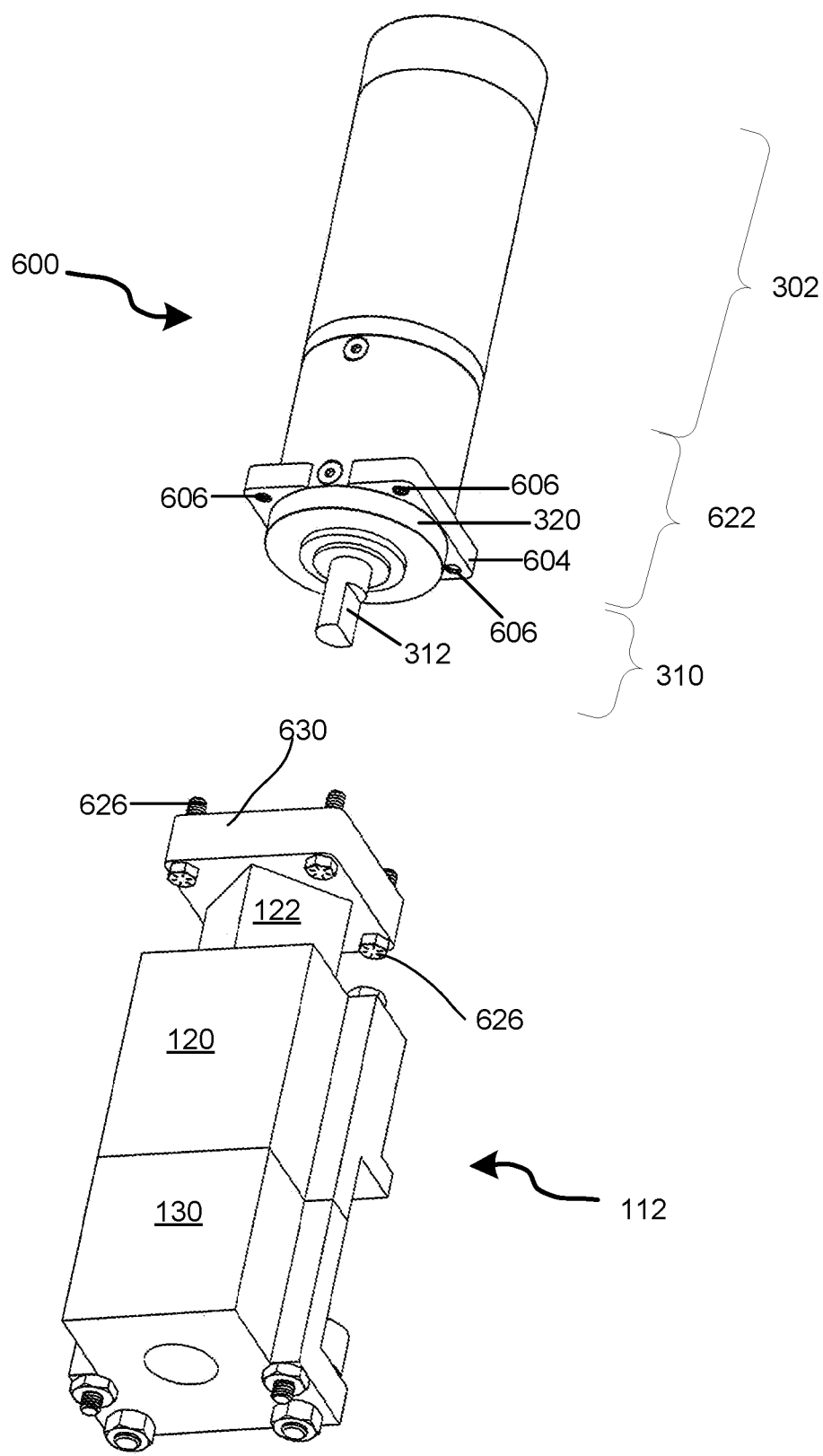
FIG. 6D: a perspective view of the embodiment of the modified motor assembly of the invention in spatial cooperation with a pinion assembly of the sliding support mechanism.

FIG. 6D complements the description of the embodiment of the invention by depicting the rotor assembly 310 resting in and affixed to the modified gearbox 622 622 and the pinion assembly 112 (counterpositioned with the motor assembly 600). The motor coupling portion 122 of the pinion assembly 112 is shown with fasteners 626 configured, in the plate 630, to reciprocate to and match the openings 606 of the collar 604 and configured to be threaded unto the openings 606 in to securely couple the housing of the motor portion 622 of the motor assembly 600 to the upper shaft assembly 120. A skilled person will unmistakably understand that, as a result of implementing this mechanical coupling, the joint formed between the rotor portion 310 and the modified gearbox 622 substantially is not exposed to the rotational torque produced by the motor of the assembly 600 and scaled up by a factor of at least 100× by the gears 332 of the gearbox 622. Instead, this torque—as far as its influence on the housing of the embodiment is concerned— is applied to the combination of the collar 604 and the plate 630, by-passing the combination of the surface relief 344 of the inner surface of the housing of the motor portion 622 meshed with the teeth 328 of the rotor portion 310.

It should be understood that, although features described in connection with FIGS. 6A-6C are described in the context of an example of a motor assembly, that some or all of the described features may be implemented in assemblies which do not require any particular motor assembly shown in the Figures or otherwise described herein.

FIGS. 9A, 9B, and 9C schematically illustrate another implementation of cooperation between the gear box and the rotor portion of the motor assembly 902 which, in comparison with the embodiment(s) of FIGS. 6A-6D, avoid the use of the collar 604 while still achieving the same result—that is, substantial compensation of the torque connection between the gearbox 304 and the bearing housing 320 of the rotor assembly 310 from which the conventional design of the motor assembly 102 detrimentally suffers. Here, the torque generated by the operation of the motor, is handled by shear stress in at least one (in the example as shown—two, of ¼" diameter each) ball bearings 910 housed in respective indentations 910A formed on the outer surface of the gearbox 904. The housing of the gear box 904 is additionally structured to include grooves or slots 914A dimensioned to accommodate corresponding clips 914 that are partially inserted into these grooved to extend transversely with respect to the axis of the motor assembly and bolted down to another portion of the assembly (as shown in this example with 918). Preferably, the slots or grooves 914A and the ball bearing contraptions 910A, 910 are "clocked" around the axis of the motor assembly 902—that is, are angularly separated by, for example 45 degrees. (In a related implementation, instead of using the ball bearings 910 and the semispherical indentations 910A, the cylindrical bearings and the corresponding semicylindrical indentations can be employed.)

Figure 10:
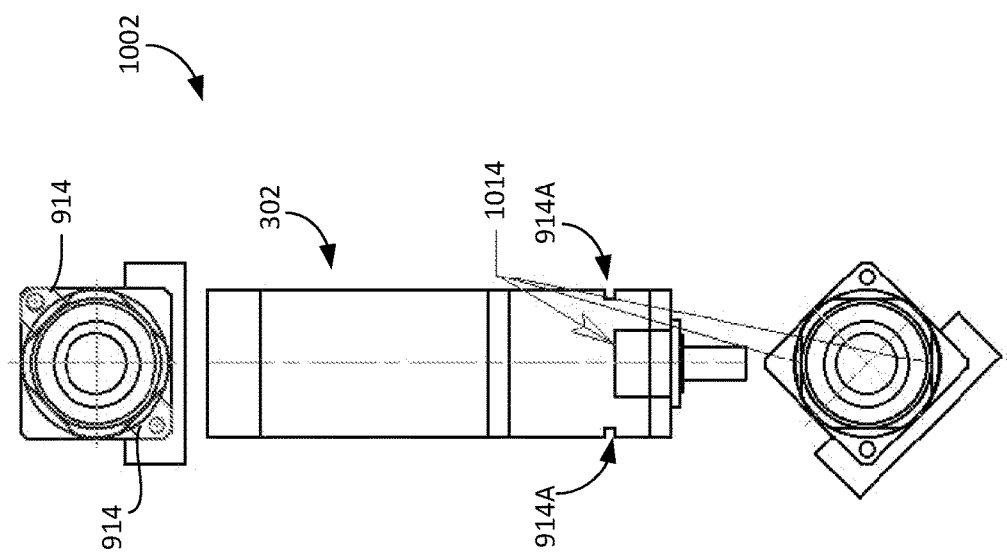

FIG. 10 illustrates, in several views, yet another related embodiment 1002 of the motor assembly, in which the housing of the gear box 1004 is also modified to include the same slots or grooves 914A (to accommodate the clips 914) and, in addition, to feature flat surfaces or recesses 1014 milled into the outer surface of the housing of the gear box 1004. The bore of the upper shaft housing is formed to contain the reciprocal flats, dimensioned to accommodate flats 1014. By analogy with the embodiment 902, the flats 1014 and the slots 914A are preferably angularly clocked" about the axis of the motor assembly.

Figure 11:
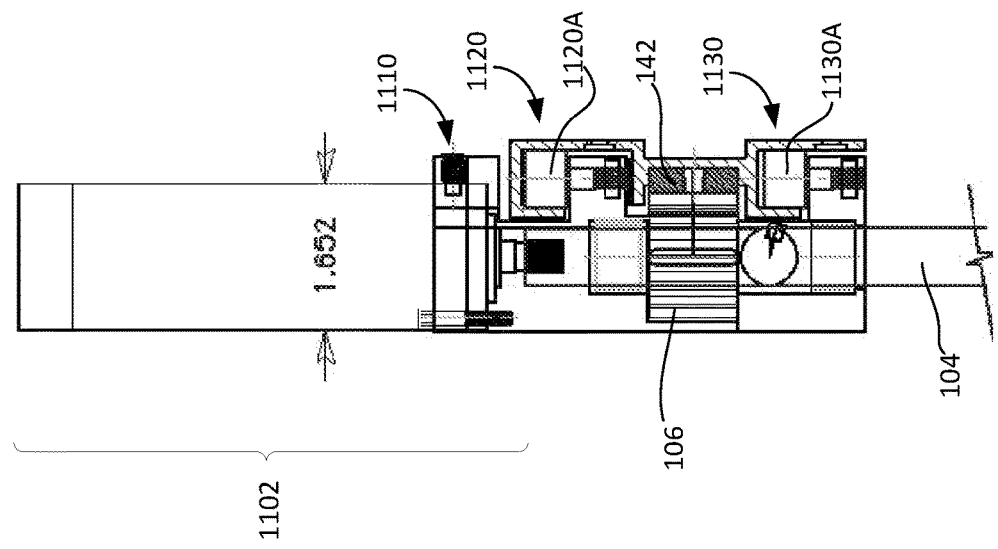

FIG. 11 schematically illustrates yet another possible implementation of the cooperation of the motor assembly 1102 with the upper shaft housing, in which the rotational torque is resisted by a center screw 1110 in shear, affixing the components of the assembly radially, while the motor assembly is held down to the upper shaft housing with the same clips 914 shown in FIGS. 9A and 10. FIG. 11 additionally illustrates the upper and lower U-shaped channels 1120, 1130 of the pinion assembly (shown to be inverted downwards, that is having their corresponding channel openings to face downwards) and the multiple upper and lower rollers 1120A, 1130A respectively dimensioned to fit into the U-shaped channels 1120, 1130 such as to maintain the pinion 106 and the rack 142 in mutual alignment and operable engagement while countering the torque applied to the rack during an operation of the motor assembly.

Figure 8:
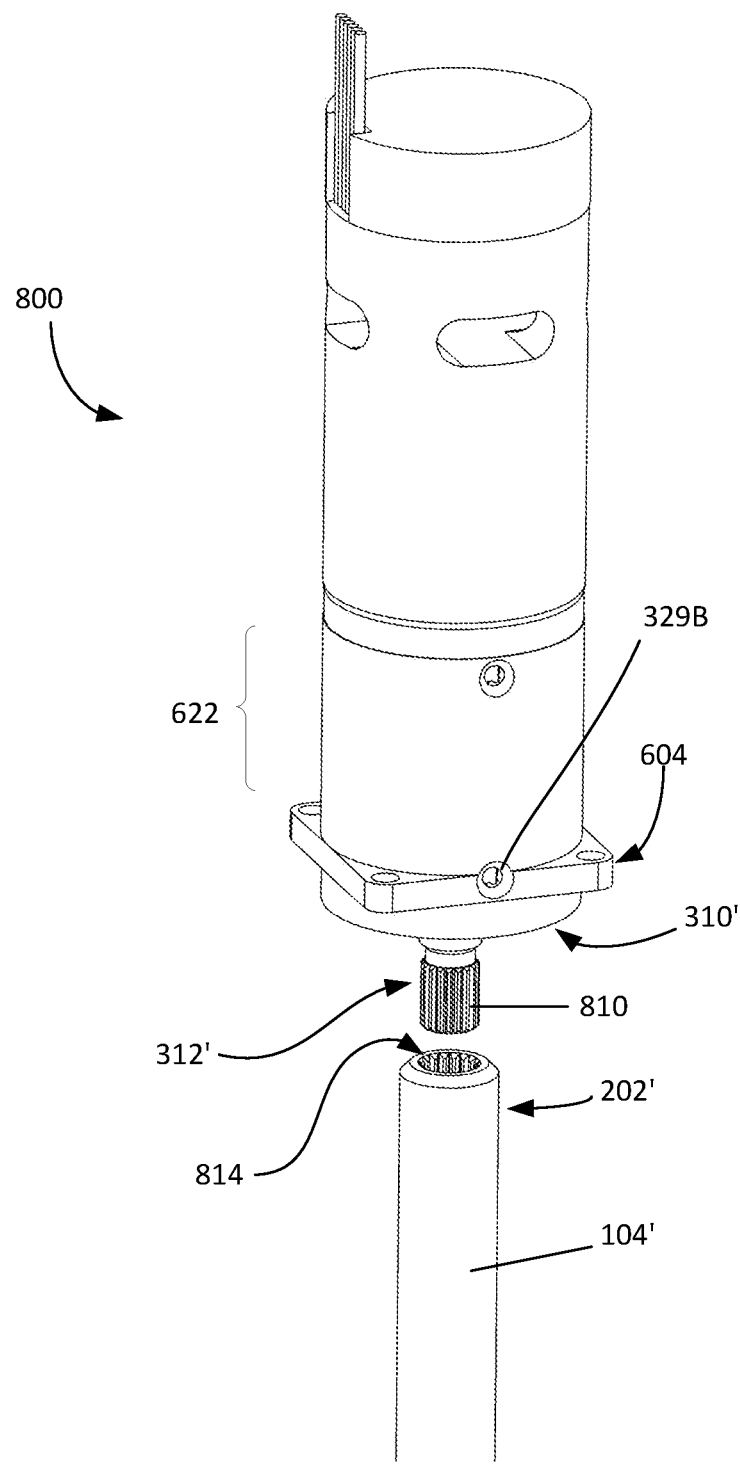
FIG. 8 shows an alternative implementation of structural cooperation between the shaft and the rotor of the sliding support mechanism.

It is also understood that in practice—and in reference to either the example of FIG. 3, of the example of FIGS. 6A-6D, or the example of FIGS. 7A-7C—the mechanical coupling between the rotor of the motor assembly (indicated as 312 in FIG. 6D, for example) and the shaft of the sliding mechanism itself (indicated as 104 in FIG. 3, for example) does not have to be arranged via an intermediate component but can be optionally arranged by configuring both the end of the rotor and the corresponding end of the shaft to contain structurally-mating (for example, male and female versions of) splines, flat surfaces, or otherwise dimensioned reciprocal structures. One such option 800 is displayed in FIG. 8, showing the embodiment of the motor assembly similar to that described in reference to FIGS. 6A-6D, with the rotor portion 310' that contains the rotor 312'. In contradistinction with the rotor 312 of FIGS. 6A-6D, however, the end of the rotor 312 contains a spline structure 810 dimensioned to cover at least a portion of the outer surface of the rotor 312'. The responsive, corresponding end 202' of the shaft 104' in this case is dimensioned to include a mating (female, as shown) spline structure 814 that meshes with the structure 810 to operably couple the rotor 312' with the shaft 104'. It is appreciated that in the simplest case, the first spline structure 810 may include a single spline or ridge while the second spline structure may include a reciprocally-shaped groove; in a related embodiment, the structure 810 contains a combination of multiple ridges and grooves while the structure 814 contains multiple reciprocally-shapes grooves and ridges.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. In some specific cases, which are within the scope of the invention, the terms "approximately" and "about", when used in reference to a numerical value, represent a range of plus or minus 20% with respect to the specified value, more preferably plus or minus 10%, even more preferably plus or minus 5%, most preferably plus or minus 2% with respect to the specified value.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

What is claimed is:

1. A sliding support mechanism having a main axis, the mechanism comprising:
    a motor assembly having a drive motor and a gearbox enclosed in a first housing unit, and an output rotor,
    a first rack having a first translational axis, a first upper sliding surface and a first lower sliding surface, and wherein at least one of the following conditions is satisfied:
        1a) the first upper sliding surface defines a first upper U-shaped channel having a first upper height and a first upper width; and
        1b) the first lower sliding surface defines a first lower U-shaped channel having a first lower height and the first lower width;
    a first pinion assembly that includes:
        a first pinion that is coupled to the first rack;
        a shaft defining said main axis and having a first end and a second end, the shaft coupled to the output rotor at the first end of the shaft;
        a first shaft housing including a first upper shaft housing portion and a first lower shaft housing portion, the first shaft housing being proximal to the first pinion, wherein the first upper shaft housing portion is configured to engage the first rack above the first pinion and the first lower shaft housing portion is configured to engage the first rack below the first pinion, and wherein at least one of the following conditions is satisfied:
            1c) the first upper shaft housing portion comprises a first wear surface configured to laterally slide on the first upper sliding surface of the first rack and/or at least two upper rollers configured to run within the first upper U-shaped channel; and
            1d) the first lower shaft housing portion comprises a second wear surface configured to laterally slide on the first lower sliding surface of the first rack and/or at least two lower rollers configured to run within the first lower U-shaped channel.

2. The sliding support mechanism according to claim 1, wherein a chosen sliding surface, from the first upper sliding surface and the first lower sliding surface, is formed of a first material characterized by a first hardness;
    wherein a chosen wear surface, from the first wear surface and the second wear surface, comprises a second material characterized by a second hardness; and wherein at least one of the following conditions is satisfied:
- 2a) the second hardness is lower than the first hardness; and
- 2b) the second material is configured to reduce friction between said chosen sliding surface and said chosen wear surface during an operation of the sliding support mechanism.

3. The sliding support mechanism according to claim 1, wherein a separation between the first and second wear surfaces along the main axis is dimensioned to limit displacement of the first shaft housing along the main axis such as to maintain operable engagement between the first pinion and the first rack along the main axis during an operation of the sliding support mechanism.

4. The sliding support mechanism according to claim 1, wherein at least one of the following conditions is satisfied:
- 4a) an end of the output rotor coupled to the first end of the shaft is structured to contain first splines while the first end of the shaft is structured to contain second splines that are dimensioned to mate and mesh with the first splines to transfer torque from the output rotor to the shaft;
- 4b) the end of the output rotor coupled to the first end of the shaft is dimensioned to contain a flat surface along an axis of the output rotor; and
- 4c) the mechanism further comprises a bearing configured to receive the shaft and encircle the shaft at a point between the output rotor and the second end of the shaft.

5. The sliding support mechanism according to claim 1, wherein the motor assembly includes a rotor portion that contains a rotor bearing housing and said output rotor passing therethrough;
wherein the first shaft housing is directly mechanically affixed to the rotor bearing housing.

6. The sliding support mechanism according to claim 1, wherein the motor assembly includes a rotor portion that contains a rotor bearing housing and said output rotor passing therethrough;
wherein the first housing unit includes a structural extension element that is disposed at an end of the first housing unit and that protrudes radially with respect to the main axis and beyond a radial extent of the rotor portion, while the first upper shaft housing is directly mechanically affixed to said structural extension element.

7. The sliding support mechanism according to claim 6, wherein the first upper shaft housing is directly mechanically attached to said structural extension element at a point outside of the radial extent of the rotor portion.

8. The sliding support mechanism according to claim 1, further comprising
a second pinion assembly coupled to the second end of the shaft and including an aperture, and
a fastener affixed to and encircling the shaft at the second end of the shaft,
wherein the aperture is dimensioned to removably receive the fastener with the shaft therein;
wherein, when the fastener is fully inserted into the aperture, the first end of the shaft is engaged with the output rotor; and
wherein, when the fastener is withdrawn from the aperture, the first end of the shaft is disengaged from the output rotor to enable the first rack translate freely along the first translational axis.

9. The sliding support mechanism according to claim 1, wherein dimensions of the first upper U-shaped channel and the first lower U-shaped channel and dimensions of the at least two upper rollers and the at least two lower rollers are defined to maintain the first pinion and the first rack in mutual alignment and operable engagement while countering a torque applied to the first rack during an operation of the motor assembly.

10. The sliding support mechanism according to claim 1, wherein an opening of neither of the first upper U-shaped channel and the first lower U-shaped channel is facing in a direction transverse to the shaft.

11. An article of manufacture comprising:
a rail disposed transversely to the first translational axis, the rail including a channel dimensioned to receive and accommodate the first pinion assembly therein in absence of an element configured to fasten the first pinion assembly to said rail or to wedge the first pinion assembly with respect to the rail, and
the sliding support mechanism according to claim 1, wherein the first pinion assembly is at least partially accommodated in said channel.

12. The sliding support mechanism according to claim 1, wherein
when the first upper shaft housing portion incorporates the at least two upper rollers, the first lower shaft housing portion includes only one roller, and
when the first lower shaft housing portion incorporates the at least two lower rollers, the first upper shaft housing portion includes only one roller.

13. The sliding support mechanism according to claim 1, wherein the first shaft housing is a unitary piece and the first upper shaft housing portion and the first lower shaft housing portion are inseparable from one another.

14. A method for operating a sliding support mechanism, the sliding support mechanism including:
a motor assembly having a drive motor and a gearbox enclosed in a first housing unit, and an output rotor,
a first rack having a first translational axis, a first upper sliding surface, and a first lower sliding surface,
a first pinion assembly that includes:
a first pinion that is coupled to the first rack;
a shaft defining said main axis and having a first end and a second end, the shaft coupled to the output rotor at the first end of the shaft;
a first shaft housing including a first upper shaft housing portion and a first lower shaft housing portion, the first shaft housing being proximal to the first pinion, wherein the first upper shaft housing portion is configured to engage the first rack above the first pinion and the first lower shaft housing portion is configured to engage the first rack below the first pinion,
wherein the sliding support mechanism is cooperated with a wall carrying a supporting rail that is disposed transversely to the first translational axis and that contains a channel dimensioned to receive and accommodate the first pinion assembly therein in absence of a fastener and/or a wedging element between the rail and the first pinion assembly, and
wherein the first rack is affixed to a slide-out body,
the method comprising:
applying force to the shaft transversely to the main axis to reposition the slide-out body along the first translational axis; and sliding the slide-out body over and in contact with a surface supporting the slide-out body from below while not impeding a repositioning of the pinion assembly along the rail.

15. The method according to claim 14, further comprising:
changing a relative positioning between the slide-out body and the wall and moving the first pinion assembly along the rail when said sliding the slide-out body happens over a portion of the surface that deviates from a substantially planar surface.

16. The method according to claim 14, wherein the first upper sliding surface defines a first upper U-shaped channel and/or the first lower sliding surface defines a first lower U-shaped channel, and further comprising:
sliding at least two upper rollers within the first upper U-shaped channel and/or sliding at least two lower rollers within the first lower U-shaped channel.

17. The method according to claim 16, wherein the first upper shaft housing portion includes a first wear surface and/or the first lower shaft housing portion includes a second wear surface, and further comprising:
sliding the first wear surface on the first upper sliding surface and/or sliding the second wear surface on the first lower sliding surface.

18. The method according to claim 17, wherein a hardness of a wear surface chosen from the first and second wear surfaces is different from a hardness of a sliding surface chosen from the first upper sliding surface and the first lower sliding surface.

19. The method according to claim 14, wherein the sliding support mechanism includes a second pinion assembly coupled to the second end of the shaft, and further comprising:
disengaging the shaft from the output rotor of the motor assembly by at least partially removing a fastener, coupled to the shaft at the second end, from an aperture of the second pinion assembly to manually reposition the slide-out body along the first transverse axis.

20. The method according to claim 14, wherein the step of applying the force includes one of
18a) transferring a torque from the motor assembly to the shaft that is mechanically engaged with the output rotor; and
18b) rotating the shaft about the main axis by manually repositioning the rack along the first translational axis while the motor assembly is disengaged from the shaft.

* * * * *